(12) United States Patent
Hasegawa

(10) Patent No.: US 9,319,168 B2
(45) Date of Patent: Apr. 19, 2016

(54) TRANSMITTING APPARATUS, RECEIVING APPARATUS, COMMUNICATION SYSTEM, AND COMMUNICATION METHOD

(75) Inventor: Fumihiro Hasegawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 130 days.

(21) Appl. No.: 14/006,995

(22) PCT Filed: Feb. 23, 2012

(86) PCT No.: PCT/JP2012/054468
§ 371 (c)(1),
(2), (4) Date: Sep. 24, 2013

(87) PCT Pub. No.: WO2012/176495
PCT Pub. Date: Dec. 27, 2012

(65) Prior Publication Data
US 2014/0016452 A1    Jan. 16, 2014

(30) Foreign Application Priority Data

Jun. 22, 2011    (JP) .................................. 2011-138432

(51) Int. Cl.
*H04J 11/00*        (2006.01)
*H04L 27/26*        (2006.01)

(52) U.S. Cl.
CPC ......... *H04J 11/0063* (2013.01); *H04L 27/2621* (2013.01); *H04L 27/2636* (2013.01)

(58) Field of Classification Search
CPC ............ H04L 27/2621; H04L 27/2614; H04L 25/0226; H04L 27/2624; H04L 27/2636; H04L 27/368; H04J 11/0063; H04W 52/42; H04W 72/04; H04W 52/16
USPC ........................................................ 370/210
See application file for complete search history.

(56) References Cited

U.S. PATENT DOCUMENTS

| 7,760,811 | B2 * | 7/2010 | Miyoshi et al. ................ 375/260 |
| 2004/0058701 | A1 * | 3/2004 | Jung et al. ..................... 455/522 |

(Continued)

FOREIGN PATENT DOCUMENTS

| CN | 101741795 A | 6/2010 |
| JP | 2004 129249 | 4/2004 |

(Continued)

OTHER PUBLICATIONS

Single Carrier Modulation with Nonlinear Frequency Domain Equalization: An Idea whose Time has come—Again, Benvenuto et al. vol. 98, No. 1, Jan. 2010.*

(Continued)

*Primary Examiner* — Edan Orgad
*Assistant Examiner* — Vanneilian Lalchinthang
(74) *Attorney, Agent, or Firm* — Oblon, McClelland, Maier & Neustadt, L.L.P.

(57) ABSTRACT

A transmitting apparatus includes a group processing unit configured to divide plurally data of one block, control processing units configured to perform predetermined control processing for each of the divided data, a combination processing unit configured to combine the data subjected to the control processing into one signal, a transmission processing unit configured to apply predetermined transmission processing to the combined signal to convert the signal into a transmission signal, and a control-signal generating unit configured to retain a predetermined number of control value candidates, one set of which includes M control values used in the control processing carried out by the control processing units, and select, as a selected candidate, one of the control value candidates based on power information of the transmission signal, and generate M control signals corresponding to the selected candidate and input the control signals to the control processing units.

16 Claims, 28 Drawing Sheets

(56) References Cited

U.S. PATENT DOCUMENTS

| | | | |
|---|---|---|---|
| 2005/0208906 A1 | 9/2005 | Miyoshi et al. | |
| 2005/0259565 A1* | 11/2005 | Fujii et al. | 370/203 |
| 2005/0265226 A1* | 12/2005 | Shen et al. | 370/210 |
| 2007/0217528 A1 | 9/2007 | Miyoshi et al. | |
| 2009/0080454 A1 | 3/2009 | Koyanagi | |
| 2010/0195597 A1* | 8/2010 | Nogami et al. | 370/329 |
| 2010/0297969 A1 | 11/2010 | Miyoshi et al. | |
| 2011/0188585 A1* | 8/2011 | Miki et al. | 375/259 |
| 2012/0183087 A1 | 7/2012 | Bi et al. | |

FOREIGN PATENT DOCUMENTS

| | | |
|---|---|---|
| JP | 2005 322998 | 11/2005 |
| JP | 2005 341056 | 12/2005 |
| JP | 2009 55395 | 3/2009 |
| JP | 2010 192977 | 9/2010 |
| WO | 2006 013693 | 2/2006 |
| WO | 2007 007673 | 1/2007 |

OTHER PUBLICATIONS

Fumihiro Hasegawa, Akihiro Okazaki, and Hiroshi Kubo; Peak power reduction techniques for multi-channel SC-OFDM; 2011; IEEE 22nd International Symposium on Personal, Indoor and Mobile Radio Communications; 5 Pages.*

Benvenuto, N., et al., "Single Carrier Modulation with Nonlinear Frequency Domain Equalization: An Idea Whose Time Has Come—Again", Proceedings of the IEEE, vol. 98, No. 1, pp. 69-96, (Jan. 2010).

Bingham, J. A. C., "Multicarrier Modulation for Data Transmission: An Idea Whose Time Has Come", IEEE Communications Magazine, vol. 28, No. 5, pp. 5-14, (May 1990).

Beyme, S., et al., "Efficient computation of DFT of Zadoff-Chu sequences", Electronics Letters, vol. 45, No. 9, Total 2 Pages., (Apr. 23, 2009).

International Search Report Issued May 29, 2012 in PCT/JP12/54468, Filed Feb. 23, 2012.

Extended European Search Report issued May 13, 2015 in Patent Application No. 12802056.7.

"Optimum family of spectrum-shaping functions for PAPR reduction in SC-FDMA" Huawei, $3^{rd}$ Generation Partnership Project (3GPP), Mobile Competence Centre, vol. RAN WG1, XP050101025, Nov. 7-11, 2005, 7 Pages.

Fumihiro Hasegawa, et al., "Peak power reduction techniques for multi-channel SC-OFDM" Personal Indoor and Mobile Radio Communications (PIMRC), 2011 IEEE $22^{nd}$ International Symposium on Personal, Indoor, and Mobile Radio Communications, XP032102206, Sep. 11, 2011, pp. 1743-1747.

* cited by examiner

EXAMPLE IN WHICH CYCLIC
SHIFT IS NOT USED

EXAMPLE IN WHICH CYCLIC
SHIFT IS USED

DIVIDED PHASE ROTATION
FOR SC SIGNAL $\theta_m^{(k,n)} = e^{j\lambda^{(k,n)}m/N} \quad 0 \leq m \leq N-1 \quad 0 \leq n \leq M-1$ $\lambda^{(k,n)}$ kTH PHASE ROTATION CANDIDATE FOR nTH GROUP $0 \leq k \leq C-1$

EXAMPLE: EXAMPLE OF NUMBER OF ROTATION CANDIDATES

C=5 $\quad (\lambda^{(k,0)}, \lambda^{(k,1)}) \in \{(0,0), (0,+\pi), (0,-\pi), (0,+\pi/2), (0,-\pi/2)\}$ EXAMPLE OF ONE CANDIDATE: $(\lambda^{(1,0)}, \lambda^{(1,1)}) = (0,+\pi)$

TRANSMITTING APPARATUS, RECEIVING APPARATUS, COMMUNICATION SYSTEM, AND COMMUNICATION METHOD

FIELD

The present invention relates to a transmitting apparatus, a receiving apparatus, a communication system, and a communication method.

BACKGROUND

In a digital communication system, frequency selectivity and time fluctuation of a transmission line occur because of multipath fading caused by reflection of a transmission signal on a building or the like and Doppler fluctuation caused by movement of a terminal. In such a multipath environment, a reception signal is a signal interfering with a transmission symbol and a symbol that reaches after a delay time.

In such a transmission line having the frequency selectivity, a single carrier transmission system attracts attention in recent years to obtain a best reception characteristic (see, for example, Non-Patent Literature 1 below). In the single carrier (SC) transmission system, peak power can be reduced compared with an OFDM (Orthogonal Frequency Division Multiplexing) transmission system (see, for example, Non-Patent Literature 2), which is multiple carrier (MC) transmission.

In a transmitter that performs the SC transmission, for example, a multi-fading measure is taken by performing transmission explained below. First, after a PSK (Phase Shift Keying) signal or a QAM (Quadrature Amplitude Modulation) signal, which is a digital modulation signal, is generated in a "Modulator", the digital modulation signal is converted into a time domain signal by a pre-coder and an IDFT (Inverse Discrete Fourier Transform) processing unit. Thereafter, as a multipath fading measure, a CP is inserted in a CP (Cyclic Prefix) inserting unit. The CP inserting unit copies a predetermined number of samples in the rear of a time domain signal and adds the samples to the top of a transmission signal. Besides, as multipath fading measure means, ZP (zero padding: zero insertion) for inserting zero in parts in the beginning and the end of data is performed.

To suppress transmission peak power, in the transmitter that performs the SC transmission, in general, DFT (Discrete Fourier Transform) processing is performed in the pre-coder.

CITATION LIST

Non Patent Literature

Non Patent Literature 1: N. Benvenuto, R. Dinis, D. Falconer and S. Tomasin, "Single carrier modulation with non-linear frequency domain equalization: an idea whose time has come-again", Proceeding of the IEEE, vol. 98, no. 1 Jan. 2010, pp 69-96

Non Patent Literature 2: J. A. C. Bingham, "Multicarrier modulation for data transmission: an idea whose time has come", IEEE Commun. Mag., vol. 28, no. 5, May 1990, pp. 5-14

SUMMARY

Technical Problem

The technology of the SC transmission in the past suppresses the transmission peak power while reducing the influence of the multipath fading. However, it is desirable to further reduce the peak power from the viewpoint of improvement of a power efficiency and the like.

The present invention has been devised in view of the above and it is an object of the present invention to obtain a transmitting apparatus, a receiving apparatus, a communication system, and a communication method that can suppress transmission power.

Solution to Problem

In order to solve above-mentioned problems and achieve the object, according to an aspect of the present invention, there is provided a transmitting apparatus including: a data dividing unit configured to divide data of one block into M divided data, M being equal to or larger than 2; M Fourier transform units configured to perform Fourier transform processing for each of the M divided data and generate M data subjected to Fourier transform; M control processing units configured to apply predetermined control processing to each of the M data subjected to the Fourier transform and generate the M data subjected to the control processing; a combination processing unit configured to apply inverse Fourier transform processing to the M data subjected to the control processing and combine the M data subjected to the control processing into one signal; a transmission processing unit configured to apply predetermined transmission processing to the combined signal to convert the signal into a transmission signal; a candidate selecting unit configured to retain a predetermined number of control value candidates, one set of which includes M control values used in the control processing carried out by the M control processing units, and select, as a selected candidate, one of the control value candidates based on power information of the transmission signal; and a control-signal generating unit configured to generate M control signals for setting the M control values included in the selected candidate respectively in the control processing units corresponding thereto and input the control signals respectively to the control processing units corresponding thereto.

Advantageous Effects of Invention

According to the present invention, there is an advantage that it is possible to suppress the transmission power.

DESCRIPTION OF EMBODIMENTS

A transmitting apparatus, a receiving apparatus, a communication system, and a communication method according to embodiments of the present invention are explained below based on the drawings. The present invention is not limited by the embodiments.

First Embodiment.

Figure 1:
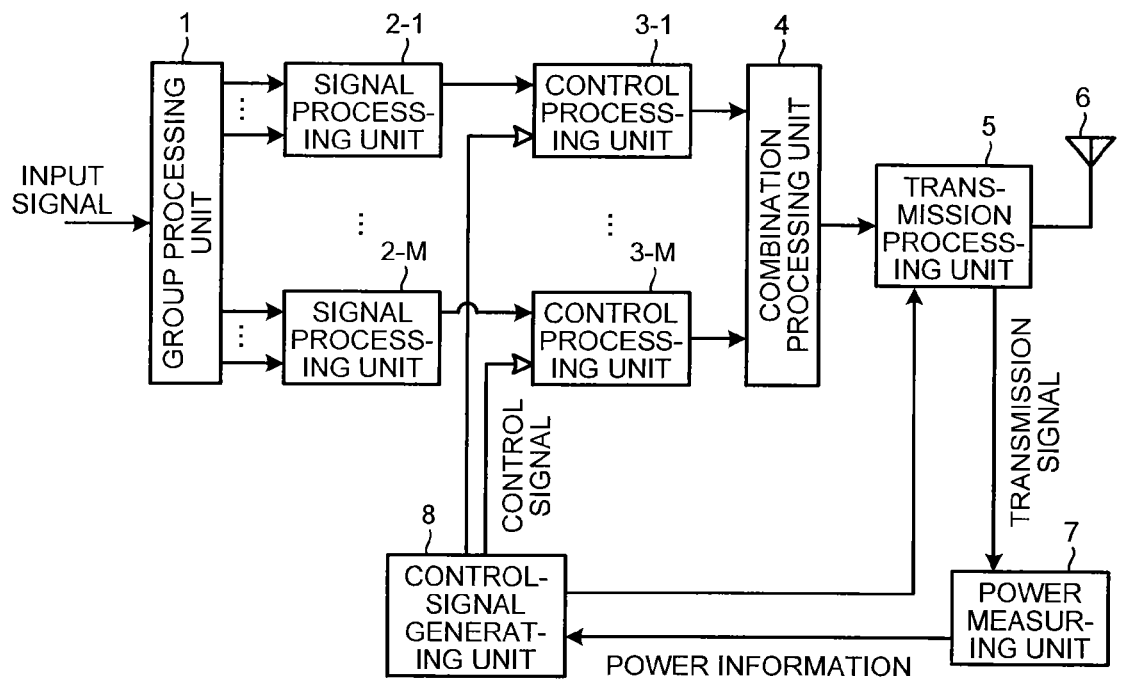
FIG. 1 is a diagram of a functional configuration example of a transmitting apparatus according to a first embodiment.

FIG. 1 is a diagram of a functional configuration example of the transmitting apparatus according to a first embodiment of the present invention. As shown in FIG. 1, the transmitting apparatus according to this embodiment includes a group processing unit 1, signal processing units 2-1 to 2-M (M is an integer equal to or larger than 2), control processing units 3-1 to 3-M, a combination processing unit 4, a transmission processing unit 5, a transmission antenna 6, a power measuring unit 7, and a control-signal generating unit 8.

A transmission signal is input to the group processing unit 1 as an input signal. The input signal is a digital modulation signal modulated by a system such as PSK or QAM. The input signal can be a signal affixed with an error correction code. The group processing unit 1 divides one block of the input signal into M and inputs divided data respectively to the signal processing units 2-1 to 2-M. Although the group processing unit 1 divides the one block into M, the group processing unit 1 can divide data of the one block into a number smaller than M. When dividing the one block, the group processing unit 1 can divide the one block to equalize data amounts of divided data or can divide the one block to vary a data amount for each of the divided data.

The one block can be configured by any number of symbols. However, for example, the one block is a data amount transmitted in one transmission in the transmitting apparatus in the past. For example, in the transmitting apparatus that performs the SC transmission in the past, a transmission signal is subjected to DFT processing in a predetermined number of symbol units to perform arrangement on a frequency and, thereafter, the transmission signal is converted into a time domain signal by IDFT processing and transmitted. In this embodiment, for example, a predetermined number of symbols are set as the one block.

The signal processing units 2-1 to 2-M respectively carry out predetermined signal processing on the input divided data and respectively input the processed divided data to the control processing units 3-1 to 3-M. As the predetermined signal processing, for example, DFT processing or the like is carried out.

The control processing units 3-1 to 3-M carry out predetermined control processing on the input data based on a control signal from the control-signal generating unit 8. The predetermined control processing is processing for suppressing transmission power. The predetermined control processing is, for example, a phase rotation, a timing shift, a cyclic shift, or a power distribution or can be a combination of these kinds of processing. The combination processing unit 4 combines the divided data subjected to the predetermined control processing by the control processing units 3-1 to 3-M into one combined signal with predetermined combination processing and inputs the combined signal to the transmission processing unit 5. The predetermined combination processing is, for example, IDFT processing and can include CP insertion processing, ZP processing, and the like.

The transmission processing unit 5 carries out, on the combined signal combined by the combination processing unit 4, predetermined transmission processing for transmitting the combined signal as a radio signal, converts the combined signal into a transmission signal, and transmits the transmission signal from the transmission antenna 6.

The power measuring unit 7 measures power of the transmission signal output from the transmission processing unit 5 and acquires predetermined power information. A request to the transmitting apparatus according to this embodiment is specified (set as a design value or the like) in the predetermined power information. For example, transmission peak power, transmission average power, a PAPR (Peak to Average Power ratio), or the like can be used.

The control-signal generating unit 8 generates, based on the power information acquired by the power measuring unit 7, a control signal for controlling the control processing units 3-1 to 3-M to set the power information to satisfy a target value and inputs the generated control signal to the control processing units 3-1 to 3-M. The target value is, for example, a design target concerning the transmission power. For example, the power measuring unit 7 acquires the transmission peak power as power information. The control-signal generating unit 8 generates a control signal to set the transmission peak power to be equal to or smaller than a predetermined target value (a design target, etc.). A general design target is to minimize the transmission peak power. However, the design target is not limited to this.

For simplification of explanation, an example in which the number of transmission antennas is one is explained. However, the operation in this embodiment can be applied as well to a system in which several transmission antennas are used. In this case, the several transmission antennas can transmit the same transmission signal or can transmit different transmission signals. When the different transmission signals are transmitted, for example, the transmitting apparatus only has to include a plurality of the combination processing units 4 and a plurality of transmission processing units. The combination processing units 4 only have to generate a combined signal for each of the transmission antennas. In this case, for example, the power measuring unit 7 acquires power information for each of the transmission processing units. The control-signal generating unit 8 generates, for each of the control processing units 3-1 to 3-M connected to the same transmission antenna, a control signal to set the power information to satisfy the design target.

Processing for generating a control signal in the control-signal generating unit 8 is explained. In the following explanation, as a specific example, the power information is transmission peak power and the design target is the transmission peak power equal to or smaller than the predetermined target value. The control-signal generating unit 8 retains, in advance, a plurality of sets of control values to be set in the control processing units 3-1 to 3-M. It is assumed that one set of control values includes control values respectively corresponding to the control processing units 3-1 to 3-M. When phase rotation is performed as the control processing carried out by the control processing units 3-1 to 3-M, the control-signal generating unit 8 retains, as sets of control values, phase rotation amounts of rotations respectively performed by the control processing units 3-1 to 3-M. In an initial state (a state in which control signals are not received), the control processing units 3-1 to 3-M can be set to directly output input signals from the signal processing units 2-1 to 2-M or control values corresponding to any one set among the sets of the control values can be respectively set in the initial state.

The control-signal generating unit 8 generates control signals corresponding to a certain set among the retained sets of the control values, inputs the control signals respectively to the control processing units 3-1 to 3-M respectively corresponding to the control signals, and acquires power information corresponding to the set of the control values from the power measuring unit 7. Similarly, the control-signal generating unit 8 acquires transmission peak power corresponding to all the sets and selects a set of the control values for which the transmission peak power is equal to or smaller than the predetermined target value and optimum. A method of selecting the optimum set of the control values depends on what the power information is and what kind of a design target the design target is. However, when the power information is the transmission peak power, for example, a set of the control values for which the transmission peak power is low can be selected as the optimum set of the control values. After selecting the optimum set of the control values, the control-signal generating unit 8 generates control signals corresponding to the selected set of the control values and input the control signals respectively to the control processing units 3-1 to 3-M corresponding thereto. In this way, in this embodiment, the control-signal generating unit 8 has a function of the control-signal generating unit that generates a control signal and a function of a candidate selecting unit that selects a candidate of control values.

Figure 2:
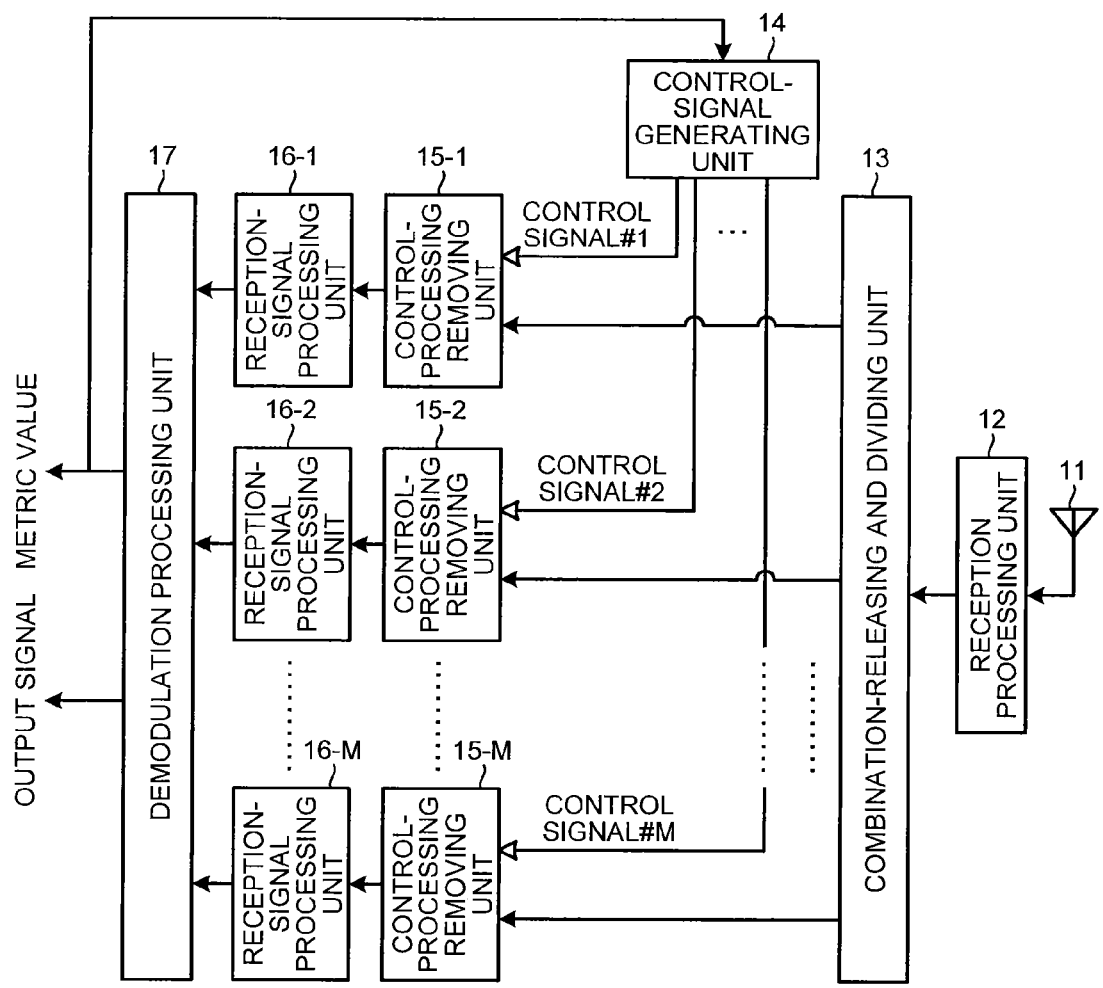
FIG. 2 is a diagram of a functional configuration example of a receiving apparatus according to the first embodiment.

A receiving apparatus that receives a signal transmitted by the transmitting apparatus according to this embodiment is explained. FIG. 2 is a diagram of a functional configuration example of the receiving apparatus according to this embodiment. As shown in FIG. 2, the receiving apparatus according to this embodiment includes a reception antenna 11, a reception processing unit 12, a combination-releasing and dividing unit (a dividing unit) 13, a control-signal generating unit 14, control-processing removing units 15-1 to 15-M, reception-signal processing units 16-1 to 16-M, and a demodulation processing unit 17.

A transmission signal transmitted by the transmitting apparatus according to this embodiment is received by the reception antenna 11 of the receiving apparatus and input to the reception processing unit 12. The reception processing unit 12 carries out predetermined reception processing on the received signal and inputs the signal to the combination-releasing and dividing unit 13. The combination-releasing and dividing unit 13 carries out processing in an inverse manner compared to the combination processing by the transmitting apparatus, decomposes the received signal, and inputs decomposed signals respectively to the control-processing removing units 15-1 to 15-M.

The control-signal generating unit 14 retains, for each of the sets of the control values retained by the transmitting apparatus, sets of control values for removing control (hereinafter referred to as removal control values). The control-signal generating unit 14 generates control signals corresponding to a certain set among the retained removal control values and inputs the control signals to the control-processing removing units 15-1 to 15-M. The control-processing removing units 15-1 to 15-M carry out, based on the input control signals, processing (control processing removal) in an inverse manner compared to the processing carried out by the control processing units 3-1 to 3-M of the transmitting apparatus. For example, when the control processing is phase rotation, at the receiving apparatus, the signals are rotated by phases, absolute values of which are the same as and signs of which are opposite to the phase rotation amounts of the rotation by the transmitting apparatus.

The reception-signal processing units 16-1 to 16-M carry out, on the signals respectively subjected to the control processing removal by the control-processing removing units 15-1 to 15-M, processing in an inverse manner compared to the processing carried out by the signal processing units 2-1 to 2-M and input the signals to the demodulation processing unit 17. The demodulation processing unit 17 carries out, on the signals input from the signal processing units 2-1 to 2-M, demodulation processing corresponding to the modulation and the encoding processing carried out on the transmission side and inputs demodulation errors (metric values) obtained by the demodulation processing to the control-signal generating unit 14.

The control-signal generating unit 14 retains the metrics (the metric values) input from the demodulation processing unit 17 in association with the sets of the removal control values. Thereafter, in the same manner, the control-signal generating unit 14 acquires the metrics corresponding to all the retained sets of the removal control values. The control-signal generating unit 14 selects a set of the removal control values with a low metric as an optimum set, generates control signals corresponding to the selected set of the removal control values, and inputs the control signals respectively to the control-processing removing units 15-1 to 15-M. Thereafter, the control processing removal is carried out based on the control signals corresponding to the selected set of the removal control values.

Figure 3:
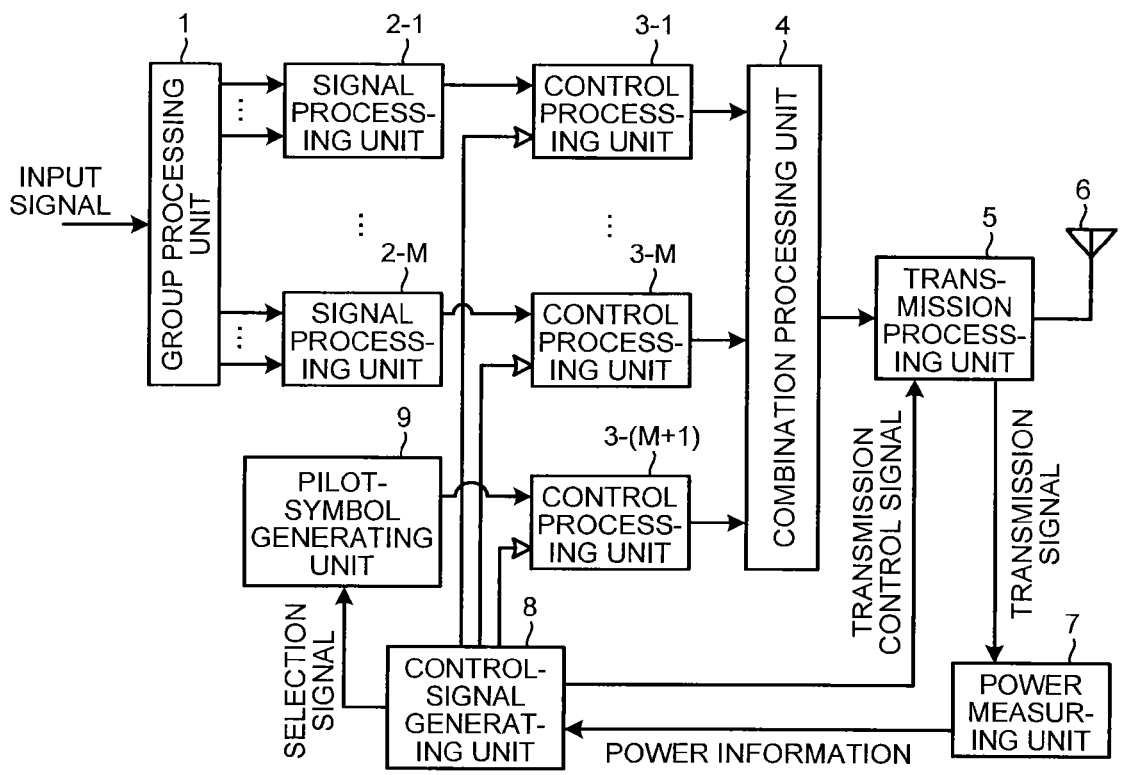
FIG. 3 is a diagram of a functional configuration example of a transmitting apparatus that transmits a pilot signal.

When a transmitting apparatus according to the other embodiments transmit a pilot signal, the operation in this embodiment can be applied. FIG. 3 is a diagram of a functional configuration example of the transmitting apparatus that transmits the pilot signal. As shown in the figure, the configuration of the transmitting apparatus is the same as the configuration shown in FIG. 1 except that a pilot-symbol generating unit 9 and a control processing unit 3-(M+1) are added. In the configuration example shown in FIG. 3, the pilot-symbol generating unit 9 generates predetermined pilot symbols. The control processing unit 3-(M+1) applies predetermined control processing to the pilot symbols. The combination processing unit 4 combines the pilot signal with divided data to generate a combined signal. The control-signal generating unit 8 retains sets of control values corresponding to the control processing units 3-1 to 3-(M+1) and generates control signals for the control processing units 3-1 to 3-(M+1). The other operations are the same as the operations in the example shown in FIG. 1.

Figure 4:
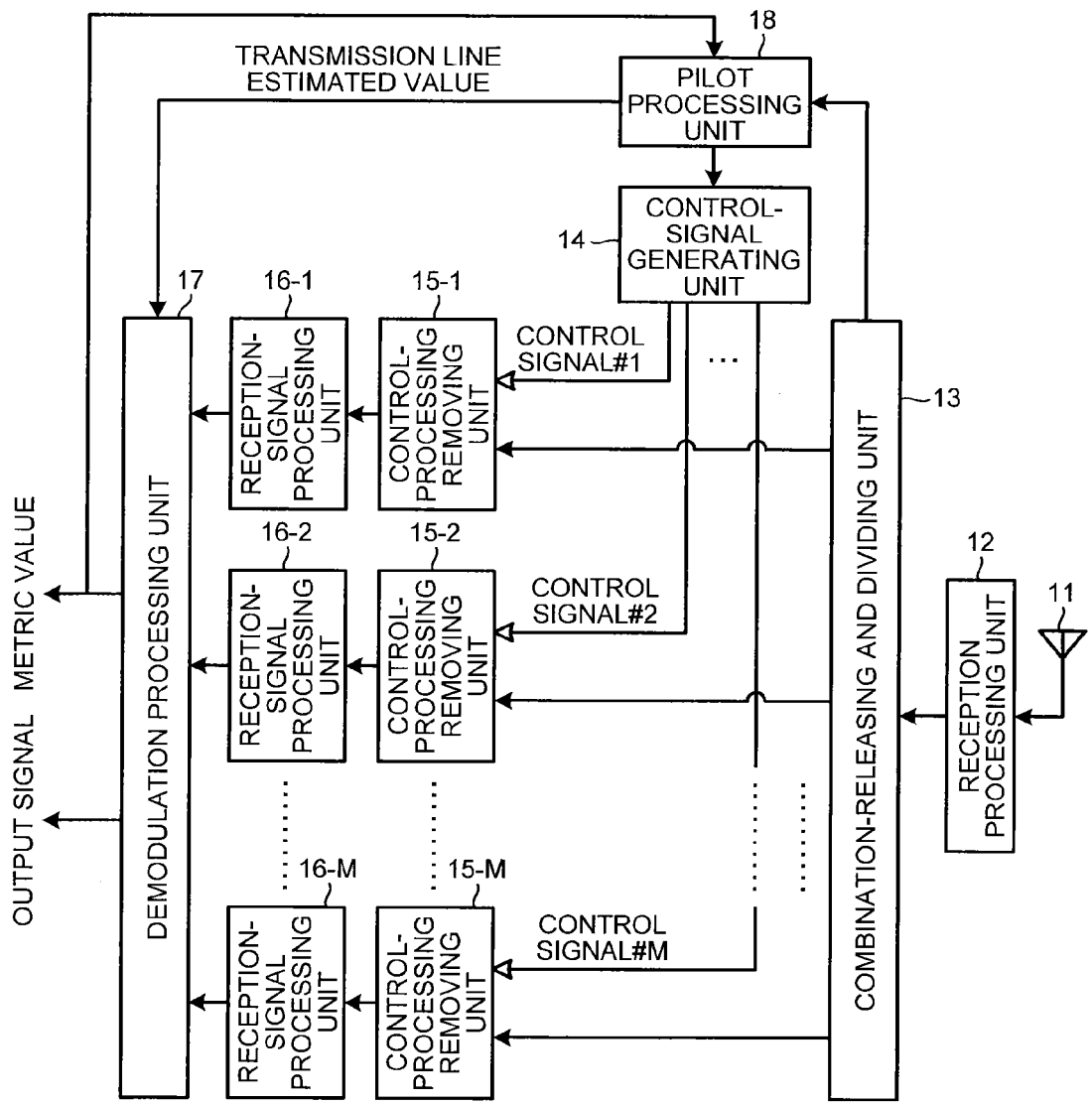
FIG. 4 is a diagram of a functional configuration example of a receiving apparatus to which the pilot signal is transmitted.

FIG. 4 is a configuration example of a receiving apparatus that receives a transmission signal transmitted by the transmitting apparatus shown in FIG. 3. The receiving apparatus shown in FIG. 4 is the same as the receiving apparatus shown in FIG. 2 except that a pilot processing unit 18 is added. In the receiving apparatus shown in FIG. 4, when decomposing a reception signal, the combination-releasing and dividing unit 13 inputs decomposed pilot symbols to the pilot processing unit 18. The pilot processing unit 18 carries out processing such as transmission line estimation using the pilot symbols and inputs a processing result to the demodulation processing unit 17. In this demodulation, the demodulation processing unit 17 performs demodulation processing using this transmission line estimated value. The other operations are the same as the operations in the example shown in FIG. 2.

In the configuration example shown in FIG. 3, the pilot-symbol generating unit 9 generates pilot symbols, which are known signal. The combination processing unit 4 combines data and the pilot symbols. Consequently, it is possible to insert the pilot symbols among data of one block. In the SC transmission in the past for transmitting data of one block without dividing the data, there is a limit in the arrangement of pilot symbols, for example, the pilot symbols are transmitted for each data of a predetermined number of blocks. On the other hand, in this embodiment, the data of one block is divided in the same manner as the first embodiment. The pilot symbols can be arranged among the divided data. Therefore, a degree of freedom of the arrangement of the pilot symbols is increased.

When the pilot symbols are combined with the data and transmitted in this way, peak power is high compared with a transmission of only the data. In this embodiment, as in the first embodiment, an appropriate set of the control values is selected based on the power information to perform the predetermined control processing. Therefore, the peak power can be suppressed even when the pilot symbols is combined with the data and transmitted.

As the pilot symbols, any symbols can be used. For example, a sequence for suppressing peak power such as a Zadoff Chu sequence introduced in 'S. Beyme and C. Leung, "Efficient computation of DFT of Zadoff-Chu Sequences", Electronics Letters, vol. 45, no. 9, Apr. 2009, pp. 461-463' can be used.

Figure 5:
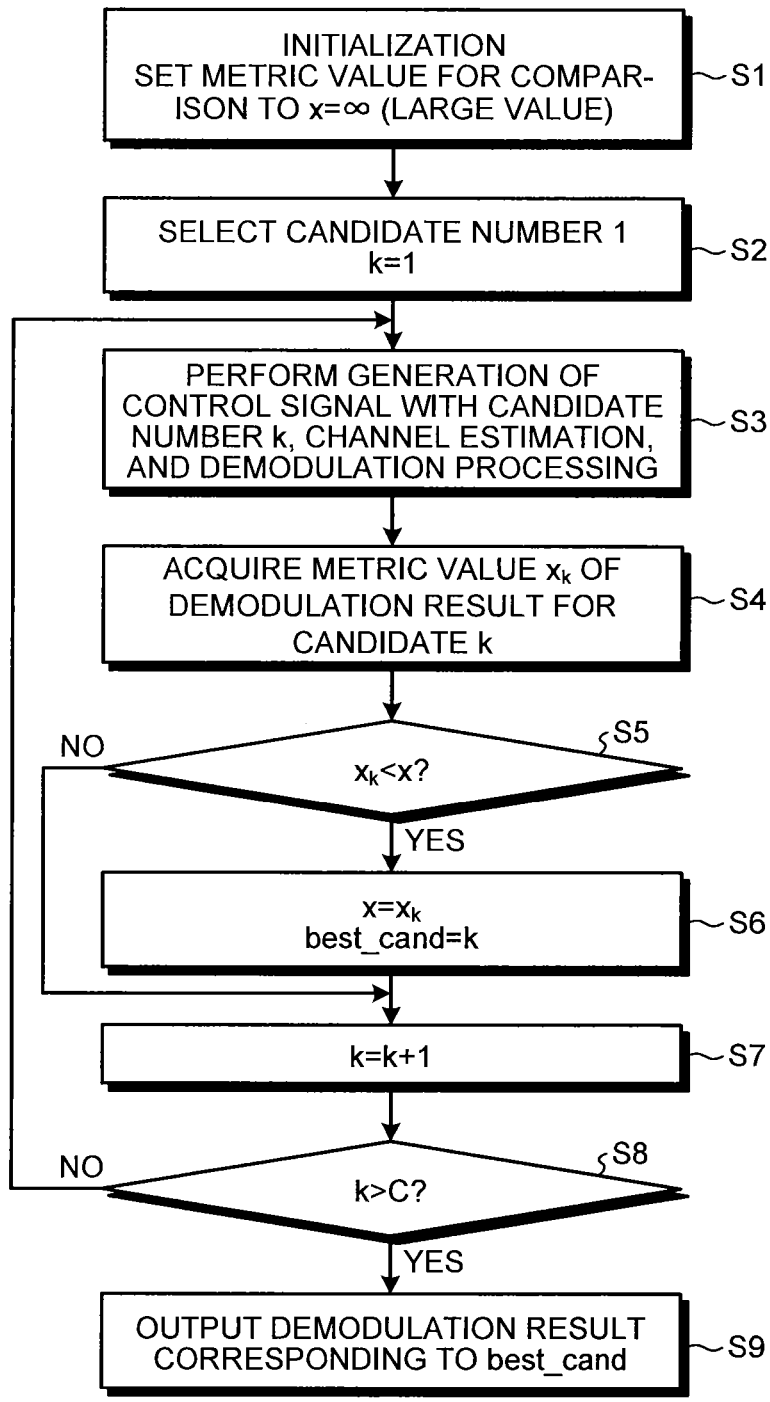
FIG. 5 is a diagram of an example of a selection procedure for a set of removal control values (a candidate of control values) in the first embodiment.

The control-signal generating unit 14 in this embodiment is explained in detail. In this embodiment, the operation of the control-signal generating unit 14 is the same in both of the configuration example shown in FIG. 2 and the configuration example shown in FIG. 4. FIG. 5 is a diagram of an example of a selection procedure for a set of removal control values (a candidate of control values) carried out by the control-signal generating unit 14 in this embodiment. In the following explanation, the number of all retained sets of removal control values is represented as C and an optimum candidate is selected out of C candidates, i.e., a candidate #1 to a candidate #C. As shown in FIG. 5, as initialization, the control-signal generating unit 14 sets a metric value for comparison x to the infinite (as a large value as possible) (step S1). Subsequently, the control-signal generating unit 14 selects the candidate #1 out of the C candidates and sets a candidate number k of the selected candidate #1 to 1 (step S2).

The control-signal generating unit 14 generates control signals corresponding to the removal control values of the candidate #k, inputs the control signals to the control-processing removing units 15-1 to 15-M, and carries out the demodulation processing (step S3). The control-signal generating unit 14 acquires a metric value $x_k$ of a demodulation result for the candidate #k from the demodulation processing unit 17 (step S4) and determines whether $x_k$ is smaller than x (step S5). When $x_k$ is smaller than x (Yes at step S5), the control-signal generating unit 14 sets x to be equal to $x_k$ and sets best_cand (a number of an optimum candidate) to be equal to k (step S6). Thereafter, the control-signal generating unit 14 sets k to be equal to k+1 and selects the candidate #(k+1) (step S7) and determines whether k is larger than C (step S8). When k is larger than C (Yes at step S8), the control-signal generating unit 14 outputs, as an output result, a demodulation result corresponding to best_cand (step S9).

When $x_k$ is equal to or larger than x at step S5 (No at step S5), the control-signal generating unit 14 proceeds to step S7. When k is equal to or smaller than C at step S8 (No at step S8), the control-signal generating unit 14 returns to step S3.

The above explanation is based on the premise that the receiving apparatus does not know which set of the control values is selected in the transmitting apparatus. The transmitting apparatus can notify, by some means, the receiving apparatus which set of the control values is selected. In that case, the control-signal generating unit 14 of the receiving apparatus does not need to carry out, for all the sets of the removal control values, processing for acquiring a metric and only has to select a set of the removal control values based on the notification.

As explained above, in this embodiment, data to be transmitted is divided into a plurality of divided data. The control processing units 3-1 to 3-M perform the predetermined control processing for each of the divided data. The combination processing unit 4 combines signals subjected to the control processing. The transmission processing unit 5 transmits a combined signal. The power measuring unit 7 acquires power information based on electric power of a transmission signal generated by the transmission processing unit 5. The control-signal generating unit 14 retains a plurality of sets of control values, selects one of the retained sets based on the power information, generates control signals based on the selected control value, and inputs the control signals to the control processing units 3-1 to 3-M. Therefore, it is possible to suppress the transmission power.

Second Embodiment.

Figure 6:
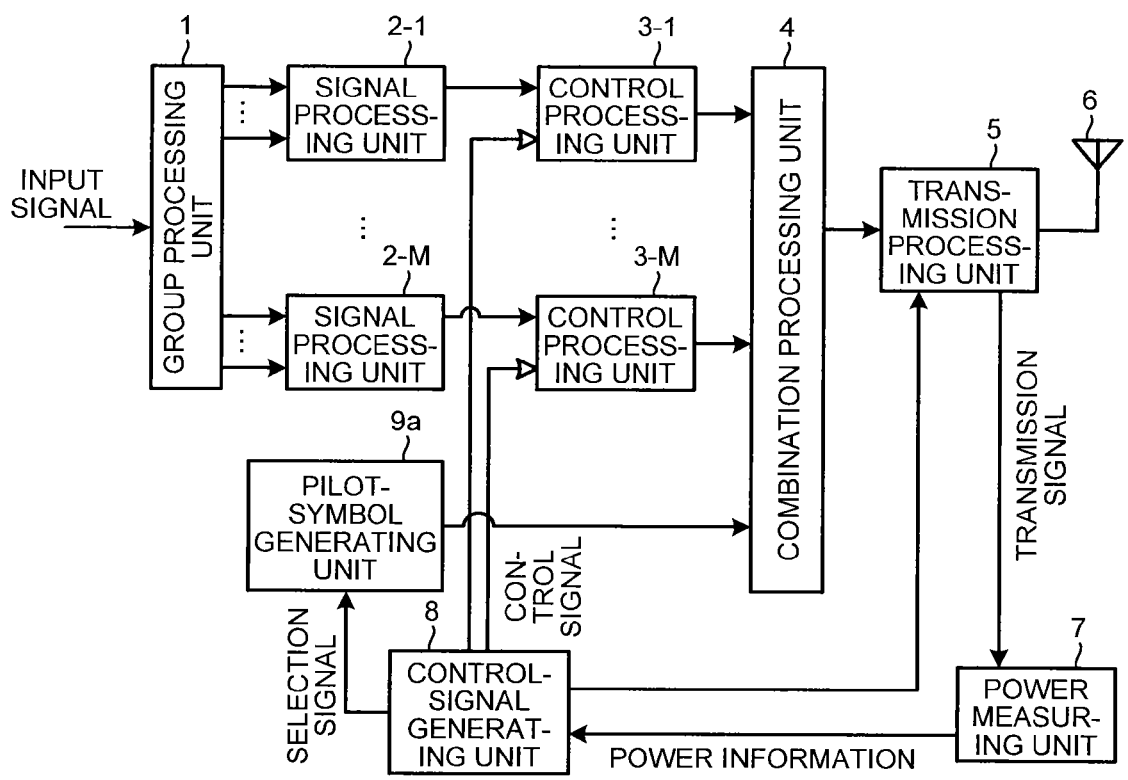
FIG. 6 is a diagram of a functional configuration example of a transmitting apparatus according to a second embodiment.

FIG. 6 is a diagram of a functional configuration of the transmitting apparatus according to a second embodiment of the present invention. As shown in FIG. 6, the configuration of the transmitting apparatus according to this embodiment is the same as the example shown in FIG. 3 in the first embodiment except that the transmitting apparatus includes a pilot-symbol generating unit 9a instead of the pilot-symbol generating unit 9. Components having functions same as the functions in the first embodiment are denoted by reference numerals and signs same as the reference numerals and signs in the first embodiment. Redundant explanation of the components is omitted.

In this embodiment, as explained below, pilot symbols are set to different values according to a selected set (candidate) of control values. Consequently, on a reception side, it is possible to learn, based on the pilot symbols, a candidate selected on a transmission side. It is possible to reduce processing on the reception side.

In the example shown in FIG. 6, control processing is not applied to an output of the pilot-symbol generating unit 9a. However, depending on content of control processing, the control processing can be applied to the output of the pilot-symbol generating unit 9a. For example, even if control processing is applied to pilot symbols, control processing (e.g., power control) having little influence in specifying a pilot sequence can be applied to the output of the pilot-symbol generating unit 9a as well.

Figure 7:
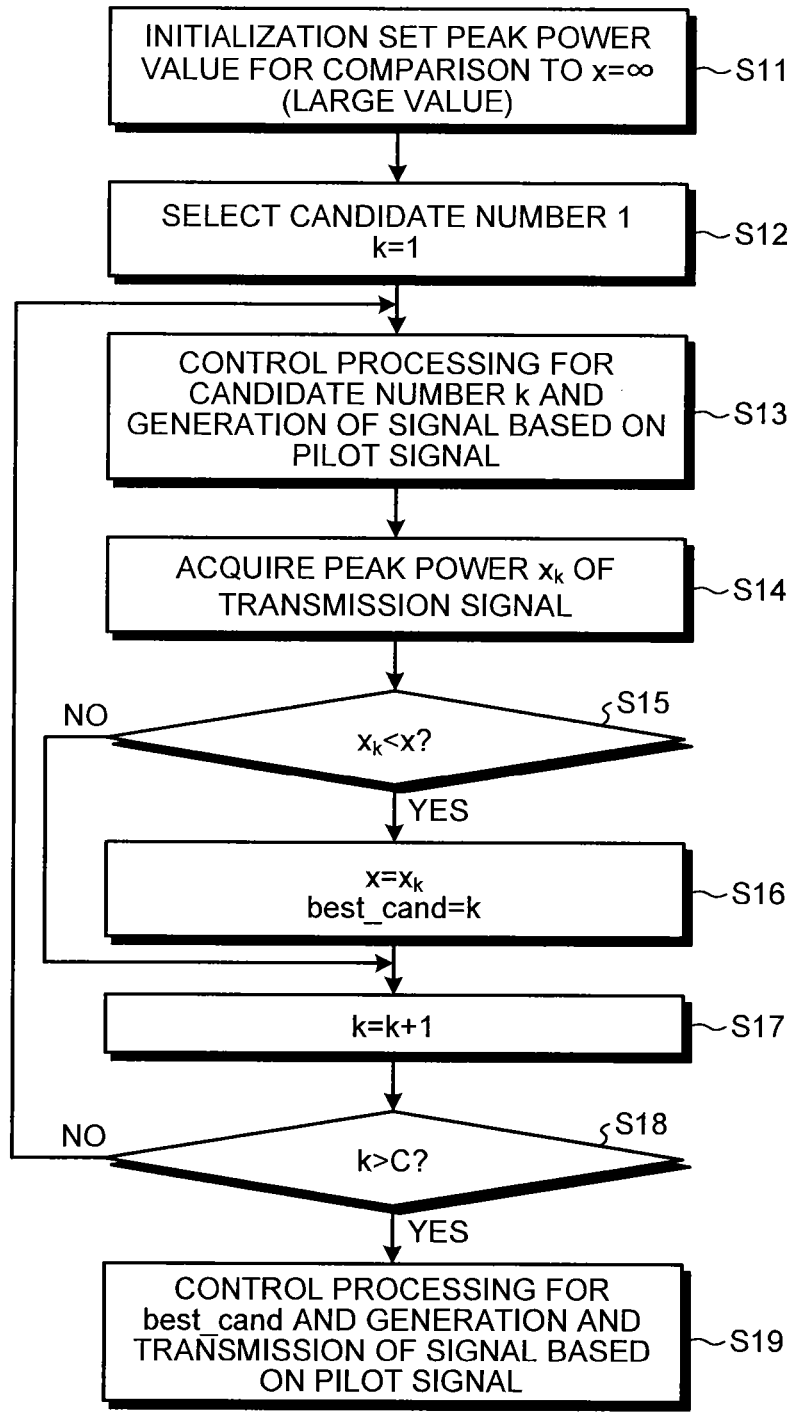
FIG. 7 is a diagram of an example of a processing procedure of a control-signal generating unit in the second embodiment.
Figure 8:
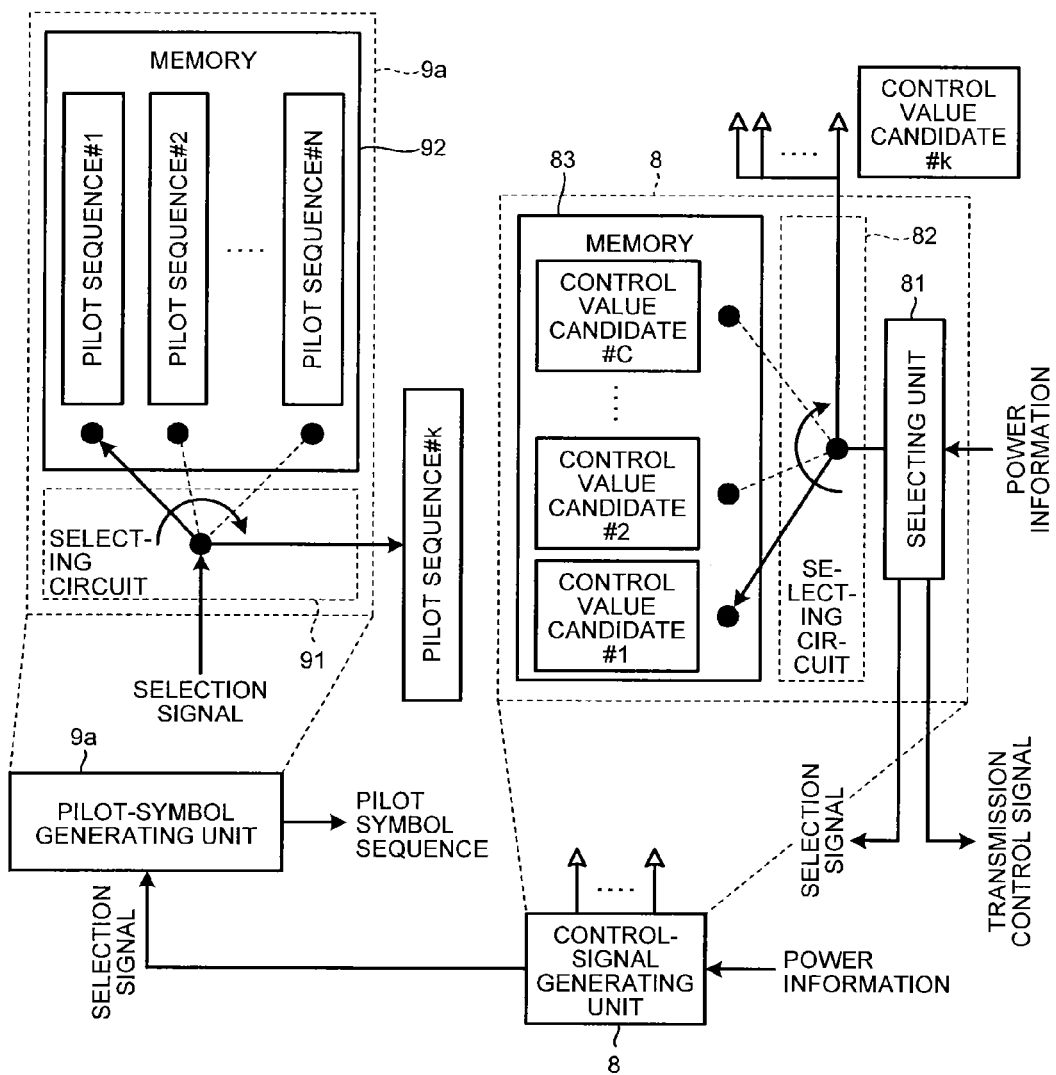
FIG. 8 is a diagram of a configuration example of a control-processing-signal generating unit and a pilot-symbol generating unit in the second embodiment.

FIG. 7 is a diagram of an example of a processing procedure by the control-signal generating unit 8 in this embodiment. FIG. 8 is a diagram of a configuration example of the control-signal generating unit 8 and the pilot-symbol generating unit 9a in this embodiment. An operation example for setting pilot symbols to different values depending on a selected set (candidate) of control values is explained with reference to FIGS. 7 and 8.

As shown in FIG. 8, the control-signal generating unit 8 in this embodiment includes a selecting unit 81, a selecting circuit 82, and a memory 83. In the memory 83, the C candidates (sets) of control values (the control value candidate #1 to the control value candidate #C) explained in the first embodiment are stored. The pilot-symbol generating unit 9a in this embodiment includes a selecting circuit 91 and a memory 92. In the memory 92, a pilot sequence #1 to a pilot sequence #C are stored. It is assumed that the pilot sequences #1 to the pilot sequence #C are sequences different from one another. "Sequence" is complex numbers or real numbers arranged in fixed order. However, the sequence is not limited to this and any sequence can be used.

As shown in FIG. 7, in the control-signal generating unit 8, as initialization, the selecting unit 81 sets the peak power for comparison x to the infinite (as large a value as possible) (step S11). Subsequently, the selecting unit 81 selects the control value candidate #1 out of the C control value candidates stored in the memory 83 and sets the candidate number k of the selected control value candidate #1 to 1 (step S12).

The selecting unit 81 generates control signals corresponding to the control value candidate #k, inputs the control signals to the control processing units 3-1 to 3-M, and inputs, to the pilot-symbol generating unit 9a, a selection signal for notifying that the candidate number (k) is selected. The pilot-symbol generating unit 9a selects, based on the selection signal, a symbol sequence corresponding to the candidate number (k) and inputs the symbol sequence to the combination processing unit 4 as pilot symbols (step S13). Consequently, a combined signal is generated using the control value and the symbol sequence corresponding to the candidate number k and input to the transmission processing unit 5.

The selecting unit 81 acquires the power information x from the power measuring unit 7 (step S14) and determines whether $x_k$ is smaller than x (step S15). When $x_k$ is smaller than x (Yes at step S15), the selecting unit 81 sets x to be equal to $x_k$ and sets best_cand (a number of an optimum candidate) to be equal to k (step S16). Thereafter, the control-signal generating unit 8 sets a candidate number to k=k+1 (step S17) and determines whether k is larger than C (step S18). When k is larger than C (Yes at step S18), the control-signal generating unit 8 generates control signals based on a set of the control values corresponding to best_cand, inputs the control signals to the control processing units 3-1 to 3-M, and inputs a selection signal for selecting the candidate number best_cand to the pilot-symbol generating unit 9 (step S19).

When $x_k$ is equal to or larger than x at step S15 (No at step S15), the control-signal generating unit 8 proceeds to step S17. When k is equal to or smaller than C at step S18 (No at step S18), the control-signal generating unit 8 returns to step S13.

Figure 9:
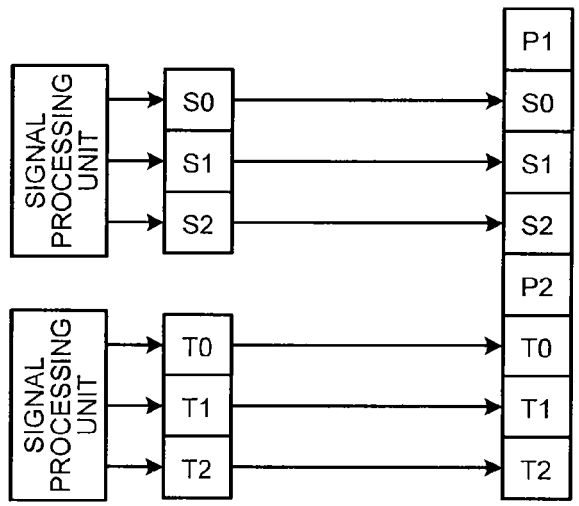
FIG. 9 is a diagram of an example in which a cyclic shift is used.
Figure 9:
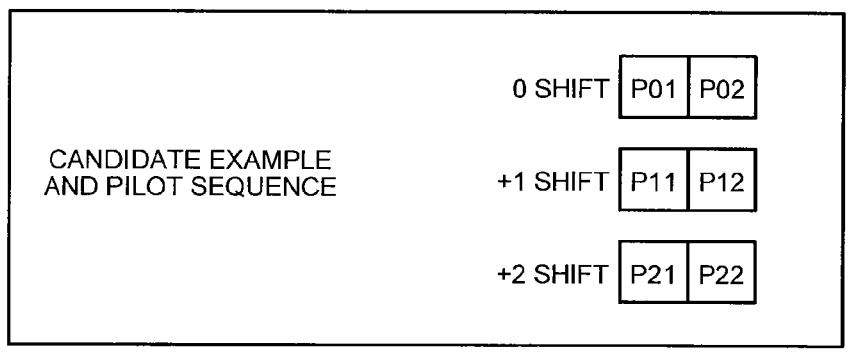
Figure 9:
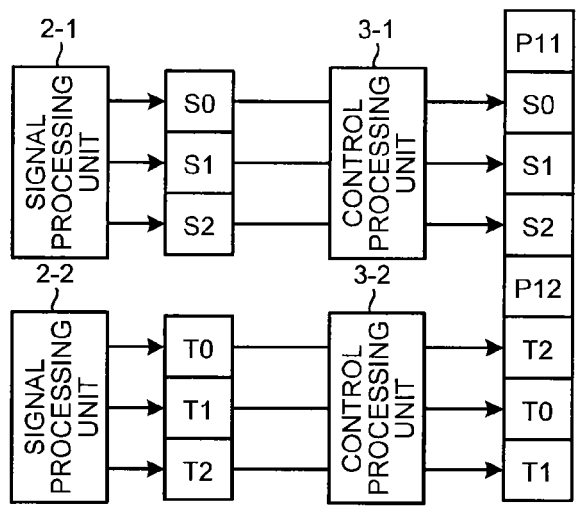

For clarification, an example in which the control processing units 3-1 to 3-M use a cyclic shift as control processing is explained. FIG. 9 is a diagram of the example in which the cyclic shift is used. It is assumed that the group processing unit 1 divides data of one block into two divided data (two groups), the number of pilot symbols per one sequence is set to 2, and the number of sets (the number of candidates) C of control values is set to 3. Each of the signal processing units 2-1 to 2-M outputs three signals (each of the divided data includes three signals).

As shown in FIG. 9, the signal processing unit 2-1 outputs signals S0, S1, and S2. The signal processing unit 2-2 outputs signals T0, T1, and T2. The control value candidates #1, #2, and #3 are respectively 0 shift, +1 shift, and +2 shift. Pilot sequences corresponding to the 0 shift are represented as P01 and P02, pilot sequences corresponding to the +1 shift are represented as P11 and P12, and pilot sequences corresponding to the +2 shift are represented as P21 and P22. In the case of the +1 shift, no shift and the +1 shift are respectively set for the control processing units 3-1 and 3-2 as control values. In the case of the +2 shift, no shift and the +1 shift are respectively set for the control processing units 3-1 and 3-2 as control values.

In this case, when a cyclic shift shown in the upper part of FIG. 9 is not used, the signals are combined in the combination processing unit 4 in the order of the output by the signal processing units 2-1 and 2-2. When the +1 shift is selected using a cyclic shift shown in the lower part of FIG. 9, the signals output by the signal processing unit 2-2 are subjected to the +1 shift by the control processing unit 3-2 and output to the combination processing unit 4. In this case, the pilot sequences P11 and P12 are generated as pilot symbols and input to the combination processing unit 4.

Figure 10:
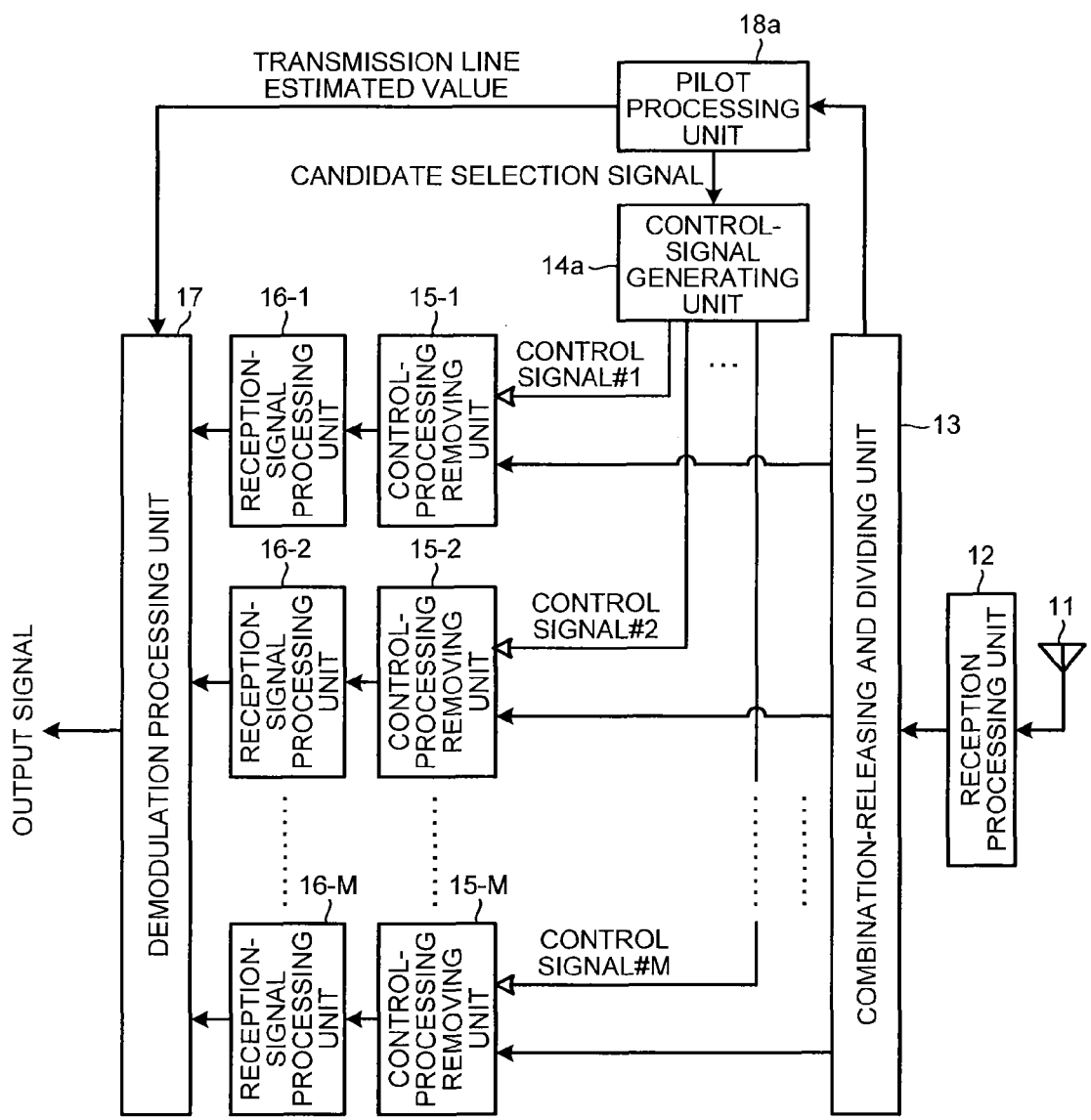
FIG. 10 is a diagram of a functional configuration example of a receiving apparatus according to a second embodiment.

A receiving apparatus according to this embodiment is explained. FIG. 10 is a diagram of a functional configuration example of the receiving apparatus according to this embodiment. As shown in FIG. 10, the receiving apparatus according to this embodiment is the same as the example shown in FIG. 4 in the first embodiment except that the receiving apparatus includes a control-signal generating unit 14a and a pilot processing unit 18a instead of the control-signal generating unit 14 and the pilot processing unit 18.

In the receiving apparatus according to this embodiment, in decomposing a reception signal, the combination-releasing and dividing unit 13 inputs decomposed pilot symbols to the pilot processing unit 18a. The pilot processing unit 18a carries out processing such as transmission line estimation using the pilot symbols and inputs a processing result to the demodulation processing unit 17. Further, the pilot processing unit 18a in this embodiment retains a pilot sequence for each control value candidate retained by the transmitting apparatus. The pilot processing unit 18a compares the retained pilot sequence and a pilot sequence included in the reception signal (e.g., correlation processing) to thereby determine which pilot sequence is transmitted and inputs a result of the determination (a candidate number) to the control-signal generating unit 14a as a selection signal. The control-signal generating unit 14a selects, based on the selection signal, a set (a candidate) of retained removal control values, generates control signals, and inputs the control signals to the control-processing removing units 15-1 to 15-M.

In this way, in the receiving apparatus according to this embodiment, it is possible to select a candidate of removal control values by determining which pilot sequence is transmitted. Therefore, it is unnecessary to perform operation for comparing metrics concerning all candidates and selecting a candidate.

As explained above, in this embodiment, the pilot sequences are set to correspond to the candidates of the control values in a one-to-one relation. The transmitting apparatus generates a pilot sequence corresponding to a selected candidate of the control values as pilot symbols and transmits the pilot symbols while including the pilot symbols in a combined signal. Therefore, it is possible to obtain an effect same as the effect in the first embodiment and reduce processing by the receiving apparatus.

Third Embodiment.

Figure 11:
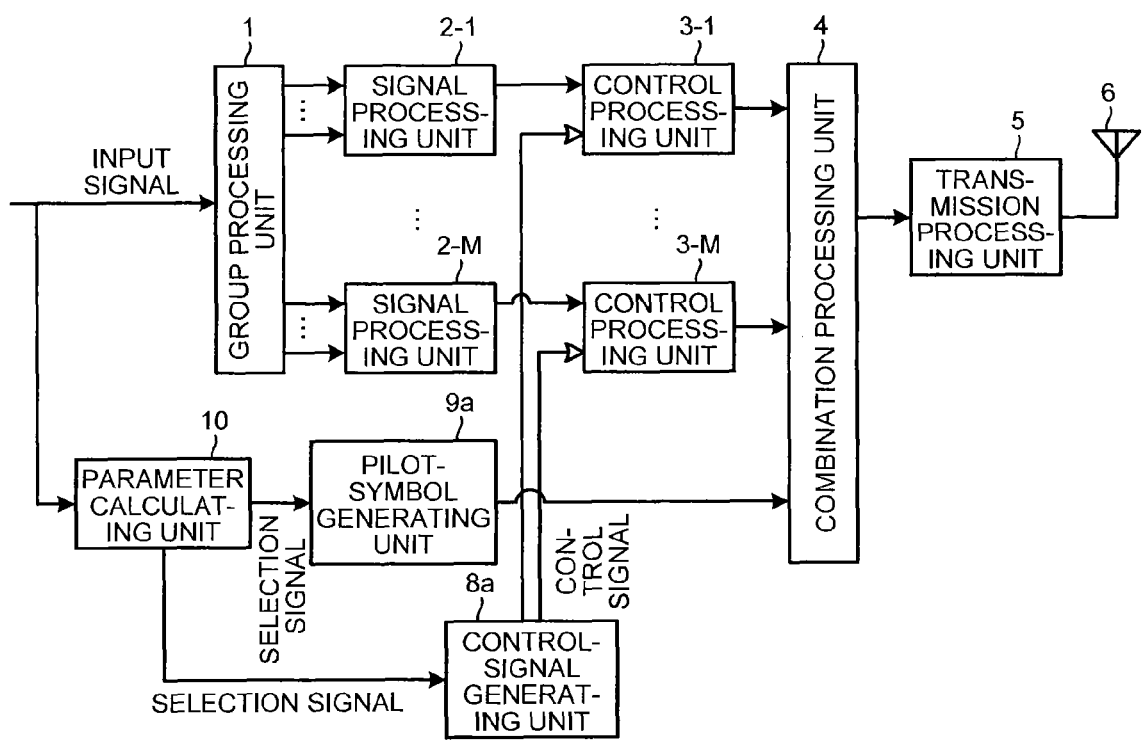
FIG. 11 is a diagram of a functional configuration example of a transmitting apparatus according to a third embodiment.

FIG. 11 is a diagram of a functional configuration example of the transmitting apparatus according to a third embodiment of the present invention. As shown in FIG. 11, the configuration of the transmitting apparatus according to this embodiment is the same as the configuration of the transmitting apparatus according to the second embodiment except that a parameter calculating unit 10 is added, the power measuring unit 7 is removed, and a control-signal generating unit 8a is provided instead of the control-signal generating unit 8. Components having functions same as the functions in the second embodiment are denoted by reference numerals and signs same as the reference numerals and sigs in the second embodiment. Redundant explanation of the components is omitted.

In the first and second embodiments, the method of selecting an optimum control signal based on power information of a transmission signal is explained. In the first and second embodiments, it is necessary to perform a search for a candidate to find an optimum candidate. On the other hand, for example, when a transmission signal amount is small, a control value to be selected as an optimum value can be selected beforehand according to an input signal or the like. In this embodiment, an example in which a control value to be selected as an optimum value is selected beforehand is explained.

First, an input signal is input to the group processing unit 1 and input to the parameter calculating unit 10. The parameter calculating unit 10 selects, based on the input signal, an optimum candidate out of C candidates of control values through calculation. The parameter calculating unit 10 inputs a selection signal indicating a candidate number of the selected candidate to the control-signal generating unit 8a and the pilot-symbol generating unit 9a.

Figure 12:
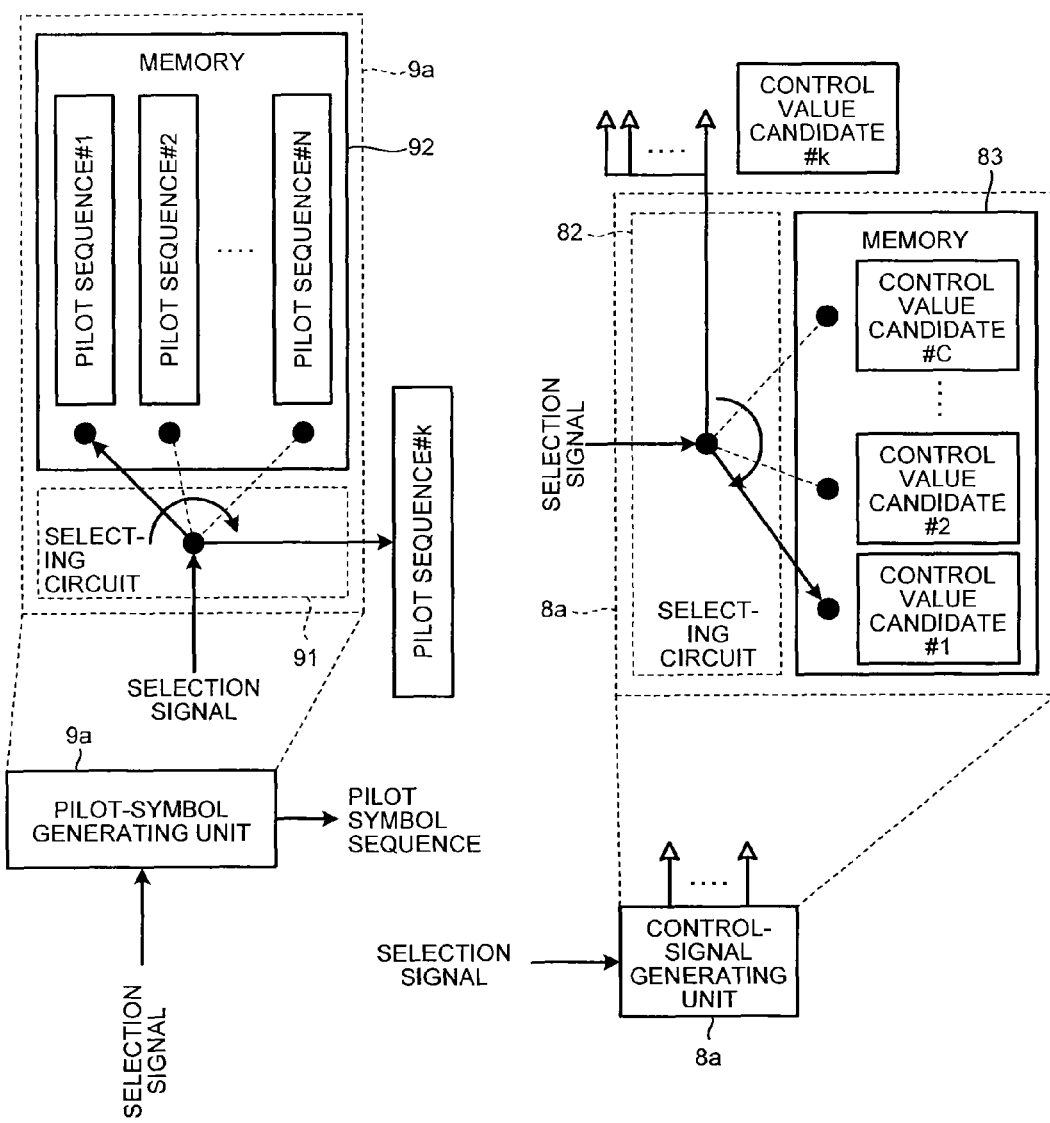
FIG. 12 is a diagram of a configuration example of a control-signal generating unit and a pilot-symbol generating unit in the third embodiment.

FIG. 12 is a diagram of a configuration example of the control-signal generating unit 8a and the pilot-symbol generating unit 9a in this embodiment. The configuration of the pilot-symbol generating unit 9a is the same as the configuration in the second embodiment. However, the selection signal is input from the parameter calculating unit 10. The control-signal generating unit 8a has a configuration in which the selecting unit 81 is removed from the control-signal generating unit 8 in the first embodiment. The selecting circuit 82 selects a control value candidate based on the selection signal input from the parameter calculating unit 10. Operations in this embodiment other than the operations explained above are the same as the operations in the second embodiment.

In the first embodiment, the control-signal generating unit 8 has the function of the candidate selecting unit that selects a candidate. In the third embodiment, the parameter calculating unit 10 has a function of a candidate selecting unit that selects a candidate, power information of which satisfies a target (e.g., transmission peak power is the minimum) through calculation.

In this embodiment, a configuration in which the parameter calculating unit 10 is added to a configuration same as the configuration in the second embodiment is shown. However, the parameter calculating unit 10 is added to a transmitting apparatus having a configuration same as the configuration in the first embodiment and the control-signal generating unit 8a is provided instead of the control-signal generating unit 8, whereby an optimum candidate can be selected through calculation as in the this embodiment.

In this way, in this embodiment, the parameter calculating unit 10 selects an optimum candidate of control values based on the input signal. Therefore, it is possible to obtain a same effect as the effect in the second embodiment and reduce processing by the transmitting apparatus.

Fourth Embodiment.

Figure 13:
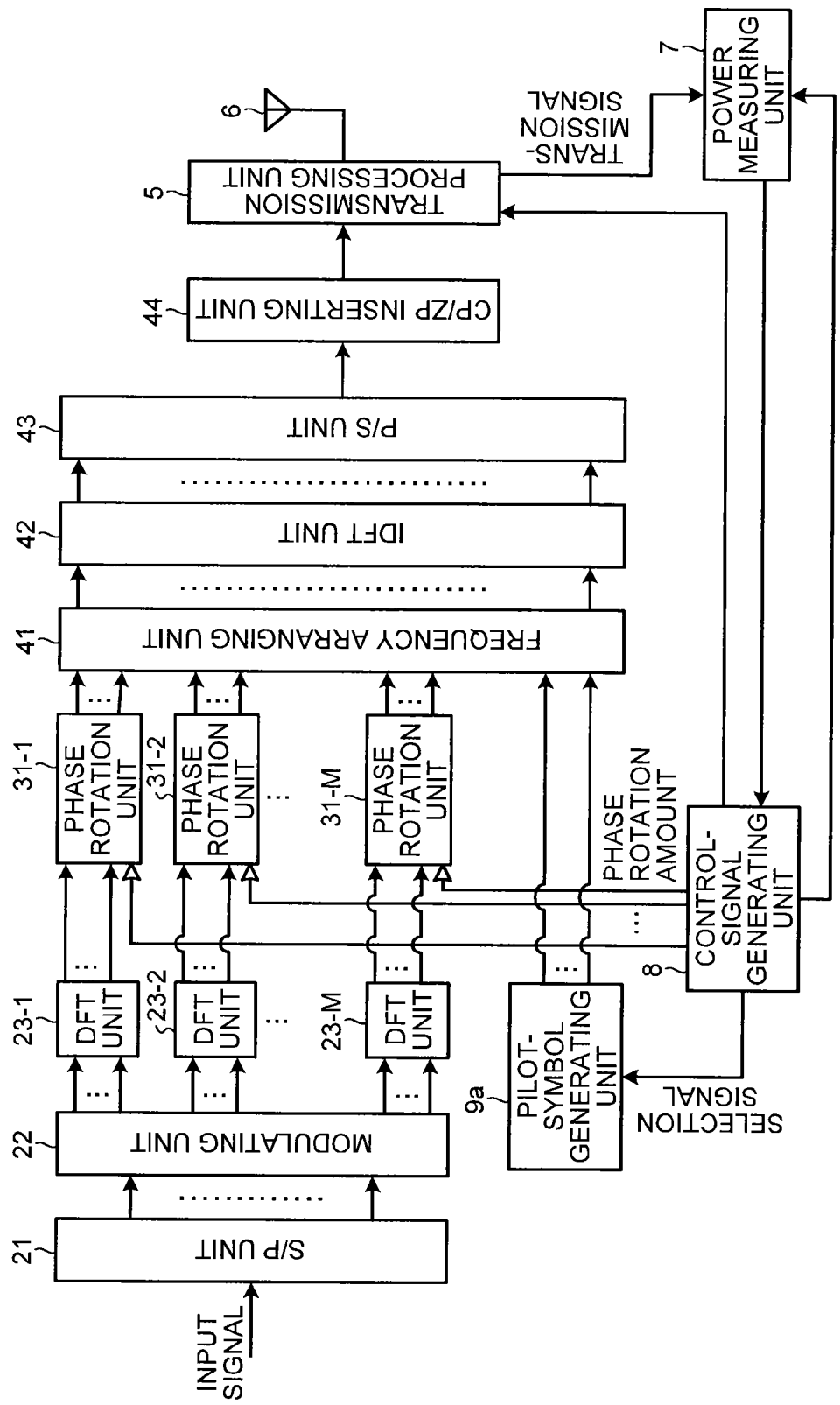
FIG. 13 is a diagram of a functional configuration example of a transmitting apparatus according to a fourth embodiment.

FIG. 13 is a diagram of a functional configuration example of the transmitting apparatus according to a fourth embodiment of the present invention. In this embodiment, a specific example in which the transmitting apparatus explained in the second embodiment is used as a transmitting apparatus that performs SC transmission is explained. As shown in FIG. 13, the transmitting apparatus according to this embodiment includes an S/P (serial-parallel conversion) unit 21, a modulating unit 22, DFT units (Fourier transform units) 23-1 to 23-M, phase rotation units 31-1 to 31-M, a frequency arranging unit 41, an IDFT unit (inverse Fourier transform unit) 42, a P/S unit 43, a CP/ZP inserting unit 44, the transmission processing unit 5, the transmission antenna 6, the power measuring unit 7, the control-signal generating unit 8, and the pilot-symbol generating unit 9a.

The transmission processing unit 5, the transmission antenna 6, the power measuring unit 7, the control-signal generating unit 8, and the pilot-symbol generating unit 9a are respectively the same as the transmission processing unit 5, the transmission antenna 6, the power measuring unit 7, the control-signal generating unit 8, and the pilot-symbol generating unit 9a in the second embodiment. The DFT units 23-1 to 23-M are equivalent to the signal processing units 2-1 to 2-M in the second embodiment. The phase rotation units 31-1 to 31-M are equivalent to the control processing units 3-1 to 3-M in the second embodiment. The frequency arranging unit 41, the IDFT unit 42, the P/S unit 43, and the CP/ZP inserting unit 44 are equivalent to the combination processing unit 4.

The S/P unit 21 and the modulating unit 22 have the function of the group processing unit 1 in the second embodiment. In the second embodiment, the input signal is explained as being the modulation signal. However, as in the fourth embodiment, modulation can be performed in the group processing unit 1. The S/P unit 21 converts an input signal, which is a series signal, into a parallel signal and inputs the input signal to the modulating unit 22. The modulating unit 22 digitally modulates the input signal into modulated data, divides the modulated data into G (G is an integer equal to or larger than 2 and equal to or smaller than M) groups, and inputs the divided modulated data respectively to the different DFT units 23-1 to 23-M.

The DFT units 23-M respectively apply DFT to the input modulated data to thereby generate SC signals and input the SC signals to the phase rotation units 31-1 to 31-M connected to the DFT units 21-1 to 21-G. When the number of symbols of the modulated data is a power of 2, FFT (Fast Fourier Transform) that requires a computational amount smaller than a computational amount of the DFT can be used instead of the DFT.

The phase rotation units 31-1 to 31-M respectively give phase rotations to the input SC signals based on control signals input from the control-signal generating unit 8.

Figure 14:
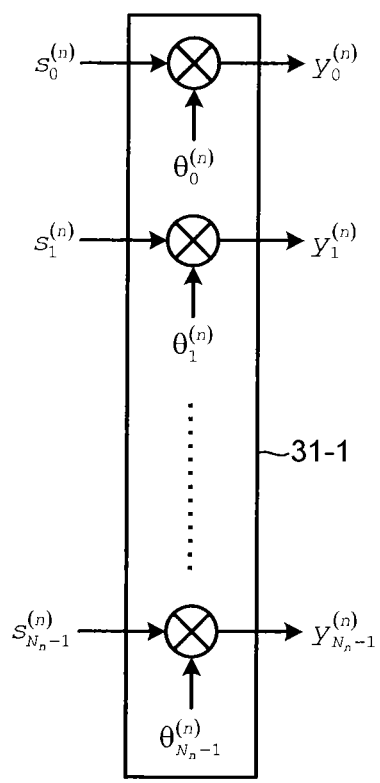
FIG. 14 is a diagram of an example of a phase rotator used in a phase rotation unit.

For example, a phase rotator shown in FIG. 14 can be used as the phase rotation units 31-1 to 31-M. A phase rotation amount can be determined in any way. However, when numbers of groups of the divided modulated data are represented as k=1, 2, . . ., and M and the number of symbols of an nth group is represented as $N_n$, for example, a phase rotation amount indicated by Formula (1) can be used as a phase rotation amount given by an nth phase rotation unit 31-n. In the formula, $\Psi m$ is a phase rotation amount instructed to the nth phase rotation unit 31-n.

$$\theta^{(n)}_m = \exp(j\Psi_n m/N_n), 0 \le m \le N_n - 1 \quad (1)$$

In FIG. 14, $s^{(n)}_m$ indicates an input mth symbol of the nth group and $y^{(n)}_m$ indicates an output mth signal (a signal subjected to phase rotation) of the nth group.

When $I^{(n)}_m$ represents the position of the mth output signal in the nth group in all the groups, the phase rotation can be given as indicated by the following formula (2):

$$\theta^{(n)}m = \exp(j\Psi n I^{(n)}_m/(N/M)), 0 \le I^{(n)}_m \le N/M-1 \quad (2)$$

Figure 15:
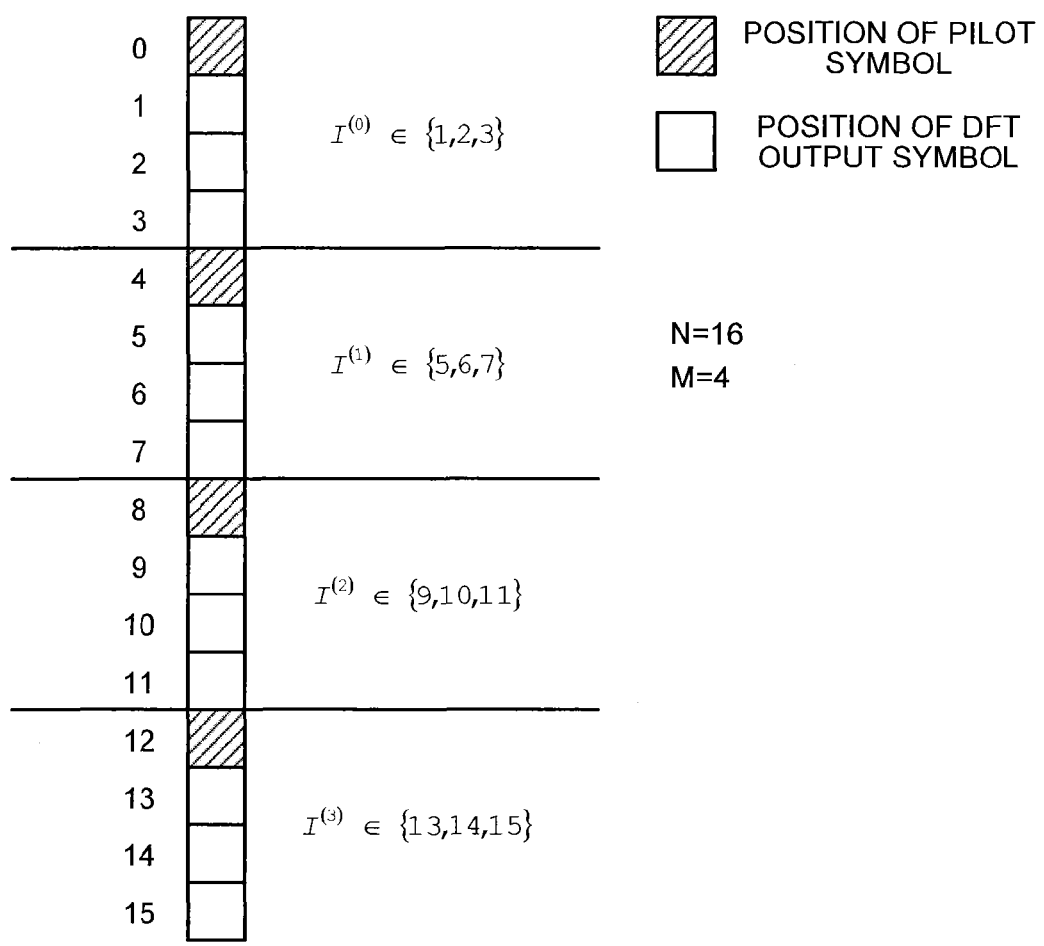
FIG. 15 is a diagram of an example of a signal arrangement of pilot symbols and DFT output symbols arranged using Formula (2).

To simplify explanation, it is assumed that $N_m = N/M$. FIG. 15 is a diagram of an example of a signal arrangement of pilot symbols and DFT output symbols arranged using Formula (2).

SC signals subjected to the phase rotation by the phase rotation units 31-1 to 31-M and the pilot symbols output from the pilot-symbol generating unit 9*a* are input to the frequency arranging unit 41, distributedly arranged on a frequency by the frequency arranging unit 41, and input to the IDFT unit 42. The IDFT unit 42 carries out IDFT processing on a signal in a frequency domain input from the frequency arranging unit 41 to thereby generate a combined signal in a time domain. When the number of data input to the IDFT is a power of 2, IFFT (Inverse FFT) that requires a computational amount smaller than a computational amount of the IDFT can be used instead of the IDFT.

The P/S unit 43 converts the combined signal, which is a parallel signal, into a series signal and inputs the combined signal to the CP/ZP inserting unit 44. The CP/ZP inserting unit 44 carries out CP processing, ZP insertion processing, or the like on the input signal and inputs the signal to the transmission processing unit 5. The operations of the transmission processing unit 5, the transmission antenna 6, the power measuring unit 7, and the control-signal generating unit 8, and the pilot-symbol generating unit 9*a* are the same as the operations in the second embodiment.

Phase rotation amounts of the rotation by the phase rotation units 31-1 to 31-M is instructed by a control signal from the control-signal generating unit 8. As explained in the second embodiment, the control-signal generating unit 8 retains a plurality of candidates (sets) of control values. The candidates can be set in any way. A specific example is explained below.

For example, M is equal to G, the number of groups G is set to 3, and phase rotation amounts (control values) for phase rotation are set to three types of 0, $\pi$, and $-\pi$. In this case, when a phase rotation amount given to a first group is represented as a, a phase rotation amount given to a second group is represented as b, and a phase rotation amount given to a third group is represented as c, as candidates (sets) of phase rotation amounts given to the groups, there are $C=3^2=9$ candidates described below. $(0, 0, 0), (0, 0, \pi), (0, 0, -\pi), (0, \pi, 0), (0, \pi, \pi), (0, \pi, -\pi), (0, -\pi, 0), (0, -\pi, \pi), (0, -\pi, -\pi)$ As a way of giving phase rotations to symbols in the groups, for example, the way of giving indicated by Formula (1) above can be used. However, the way of giving phase rotations is not limited to this. As explained in the second embodiment, the control-signal generating unit 8 selects, based on power information, a candidate with minimum transmission peak power among the nine candidates, generates control signals corresponding to the selected candidate, and inputs the control signals to the phase rotation units 31-1 to 31-G. The control-signal generating unit 8 inputs a candidate number corresponding to the selected candidate to the pilot-symbol generating unit 9*a* as a selection signal.

In the case of the SC transmission, as explained above, if one phase rotation amount is instructed for a kth group, phase rotation amounts for the symbols are determined as indicated by Formula (1). On the other hand, in the MC transmission, it is necessary to designate phase rotation amounts for the symbols. Therefore, when transmission peak power is reduced using phase rotation in the MC transmission, the number of candidates of the phase rotation amounts is an extremely large number.

Figure 16:
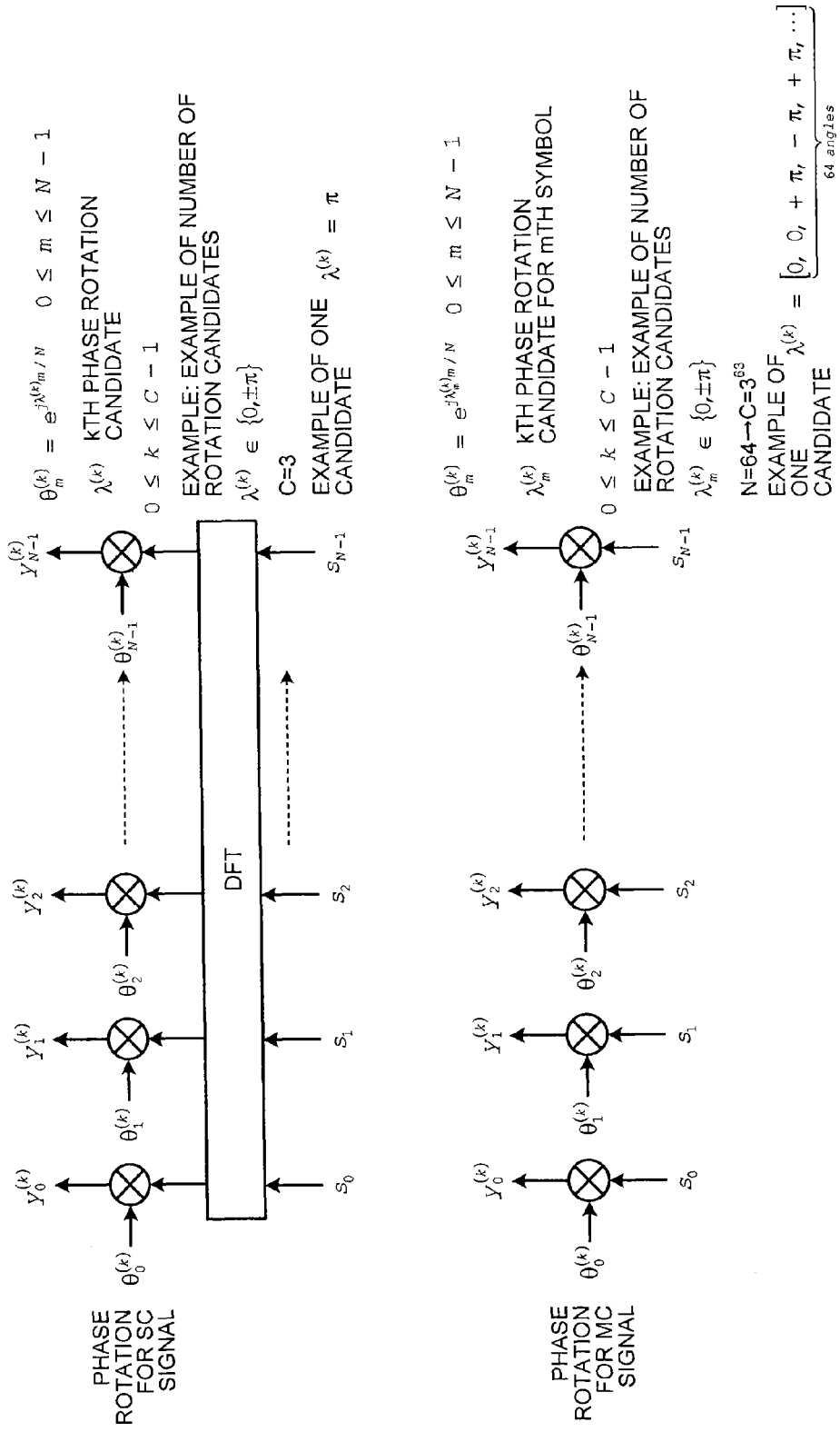
FIG. 16 is a diagram of comparison of a phase rotation for an SC signal and a phase rotation for an MC signal.

FIG. 16 is a diagram of comparison of a phase rotation for an SC signal (phase rotation in performing the SC transmission) and phase rotation for an MC signal (phase rotation in performing the MC transmission). In FIG. 16, the phase rotation for an SC signal in not performing division of data is shown in the upper part and the phase rotation for an MC signal is shown in the lower part. In the phase rotation for a MC signal shown in the lower part of FIG. 16, for example, when phase rotation amounts are set to three types of 0, $\pi$, and $-\pi$, G is set to 2, and N represents a total number of symbols, $C=3^{63}$ candidates are provided. On the other hand, in the phase rotation for an SC signal in a kth phase rotation unit 31-k shown in the upper part of the figure, when phase rotation amounts are set to three types of 0, $\pi$, and $-\pi$ and G is set to 2, C=3 candidates only have to be provided. In this way, in the phase rotation in the SC transmission, the number of candidates can be reduced compared with the MC transmission. Therefore, it is possible to more easily realize the phase rotation in the SC transmission than the phase rotation in the MC transmission.

Figure 17:
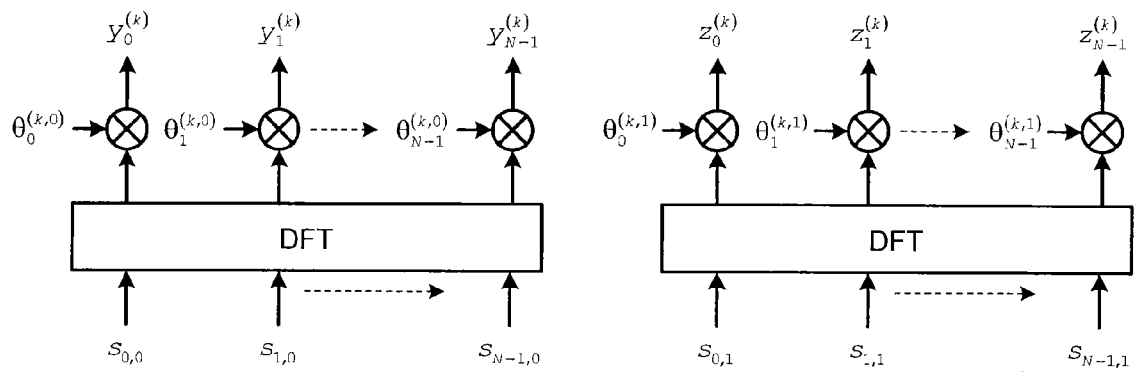
FIG. 17 is a diagram of an example of divided phase rotation for an SC signal.

FIG. 17 is a diagram of an example of divided phase rotation for an SC signal. In FIG. 17, an example of phase rotation for an SC signal in dividing modulated data into a plurality of groups and performing DFT as explained in this embodiment is shown. When a phase rotation amount in instructing a kth candidate among C candidates to an nth group (to the phase rotation unit 31-n) is represented as $\lambda^{(k,n)}$, a phase rotation amount for an mth symbol of the nth group can be represented by the following Formula (3). The example n=0, 1 is shown in FIG. 17.

$$\theta^{(n)}m = \exp(j\lambda^{(k,n)}m/N), 0 \le m \le N-1, 0 \le n \le M-1 \quad (3)$$

In Formula (3), it is assumed that the number of symbols N forming the groups is equal among the groups. When the number of symbols is different among the groups, $N_n$ only has to be used instead of N.

In this embodiment, when the SC transmission is performed and the phase rotation processing is performed as control processing, a pilot sequence corresponding to a selected candidate number is transmitted as in the second embodiment. However, when a pilot signal is not used for notification of the candidate number as explained in the first embodiment, it is also possible to perform the SC transmission and perform the phase rotation processing as the control processing.

In FIG. 17, when groups are two groups of n=0, 1 and five phase rotation amounts of the groups are 0, −π, π, −π/2, and π/2, five candidate examples {(0, 0), (0, π), (0, −π), (0, π/2), (0, −π/2)} are described. The candidate examples shown in FIG. 17 are only an example. Candidate examples are not limited to this example.

A receiving apparatus according to this embodiment is the same as the receiving apparatus explained in the second embodiment. The control-processing removing unit and the reception-signal processing unit explained in this embodiment only have to carry out processing in an inverse manner compared to the processing on the transmitting apparatus side.

In this way, in this embodiment, when the SC transmission is performed, a phase rotation amount for minimizing transmission peak power is selected and set as explained in the second embodiment using the phase rotation processing as the control processing. Therefore, when pilot symbols are combined with divided data and transmitted in the SC transmission, it is possible to suppress the transmission peak power.

Fifth Embodiment.

Figure 18:
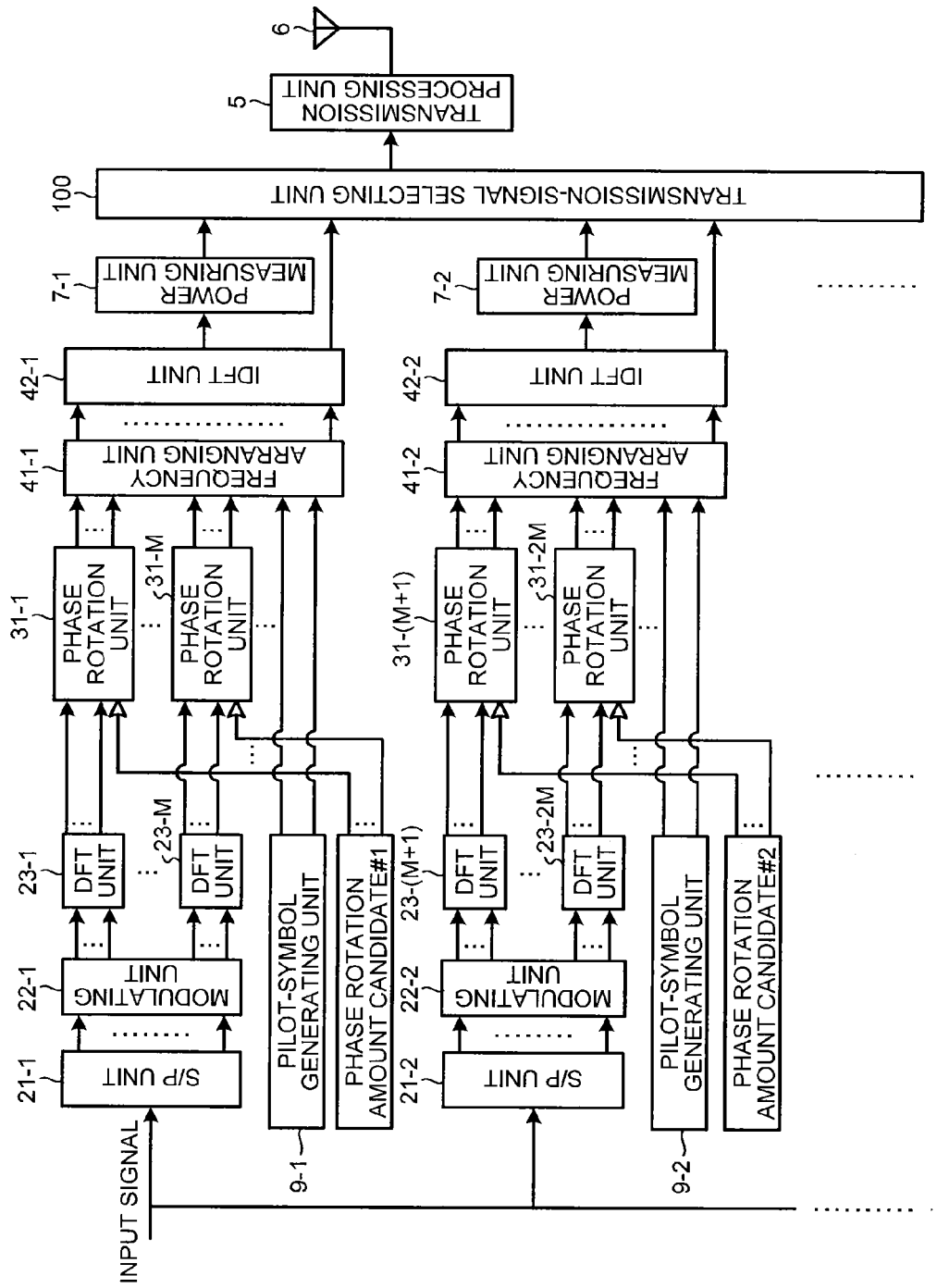
FIG. 18 is a diagram of a functional configuration example of a transmitting apparatus according to a fifth embodiment.

FIG. 18 is a diagram of a functional configuration example of the transmitting apparatus according to a fifth embodiment of the present invention. In this embodiment, the transmitting apparatus includes S/P units 21-1 to 21-L (L is an integer equal to or larger than C), modulating units 22-1 to 22-L, DFT units 23-1 to 23-(L×M), phase rotation units 31-1 to 31-(L×M), frequency arranging units 41-1 to 41-L, IDFT units 42-1 to 42-L, power measuring units 7-1 to 7-L, a transmission-signal selecting unit 100, the transmission processing unit 5, the transmission antenna 6, and the pilot-symbol generating units 9-1 to 9-L. In FIG. 18, for simplification of the figure, components with L=1, 2 are shown and components with L equal to or larger than 3 are not shown.

The transmission processing unit 5 and the transmission antenna 6 are the same as the transmission processing unit 5 and the transmission antenna 6 in the first embodiment. The S/P units 21-i, the modulating units 22-i, the DFT units 23-(M×(i−1)+1) to 23-(i×M), the phase rotation units 31-(i×(M−1)+1) to 31-(i×M), the frequency arranging units 41-i, the IDFT units 42-i, and the power measuring units 7-i are respectively the same as the S/P unit 21, the modulating unit 22, the DFT units 23-1 to 23-M, the phase rotation units 31-1 to 31-M, the frequency arranging unit 41, the IDFT unit 42, and the power measuring unit 7, respectively in the fourth embodiment. That is, in this embodiment, the transmitting apparatus includes L sets of the transmission-signal generating units each including the S/P unit 21, the modulating unit 22, the DFT units 23-1 to 23-M, the phase rotation units 31-1 to 31-M, the frequency arranging unit 41, the IDFT unit 42, and the power measuring unit 7 in the fourth embodiment. In FIG. 18, a P/S unit and a CP/ZP inserting unit are not shown. However, the transmitting apparatus includes the P/S unit and the CP/ZP inserting unit for each of the transmission-signal generating units as in the fourth embodiment.

In this embodiment, instead of the control-signal generating unit 8 sequentially setting candidates of phase rotation amounts, the transmitting apparatus includes the transmission-signal generating units equal to or more than the number of phase rotation amounts C. Phase rotation amounts corresponding to the candidates (phase rotation amount candidates #1, #2, . . .) are set in advance in the phase rotation units 31-1 to 3 1-(L×M) of the transmission-signal generating units, whereby power information for each of the candidates is obtained at a time. For example, the phase rotation amounts are fixed and set in advance, for example, candidates of a first phase rotation amount are set in the phase rotation units 31-1 to 31-M and candidates of a second phase rotation amount are set in the phase rotation units 31-(M+1) to 31-2M. A pilot symbol generating unit 9-k generates a symbol sequence corresponding to a candidate number of a kth phase rotation amount.

The transmission-signal selecting unit 100 selects power information with minimum transmission peak power among L kinds of power information input from the power measuring units 7-1 to 7-L, selects, as a combined signal subjected to optimum control processing, a combined signal input from the transmission-signal generating unit corresponding to the selected power information, and outputs the combined signal to the transmission processing unit 5.

In the explanation in this embodiment, when the SC transmission is performed and the phase rotation processing is performed as the control processing, instead of sequentially setting candidates of phase rotation amounts, power information for each of the candidates is obtained at a time. However, when transmission is not the SC transmission or when processing other than the phase rotation is performed as the control processing, it is also possible to adopt a configuration in which power information for each of candidates is obtained at a time.

In this way, in this embodiment, the transmitting apparatus includes the transmission-signal generating units equal to or more than the number of phase rotation amounts C. Phase rotation amounts corresponding to the candidates are set in advance in the phase rotation units 31-1 to 31-(L×M) of the transmission-signal generating units, whereby power information for each of candidates is obtained at a time. The transmission-signal selecting unit 100 selects an optimum combined signal based on power information. Therefore, it is possible to obtain a same effect as the effect in the fourth embodiment and select a transmission signal subjected to optimum control processing in a short time.

Sixth Embodiment.

Figure 19:
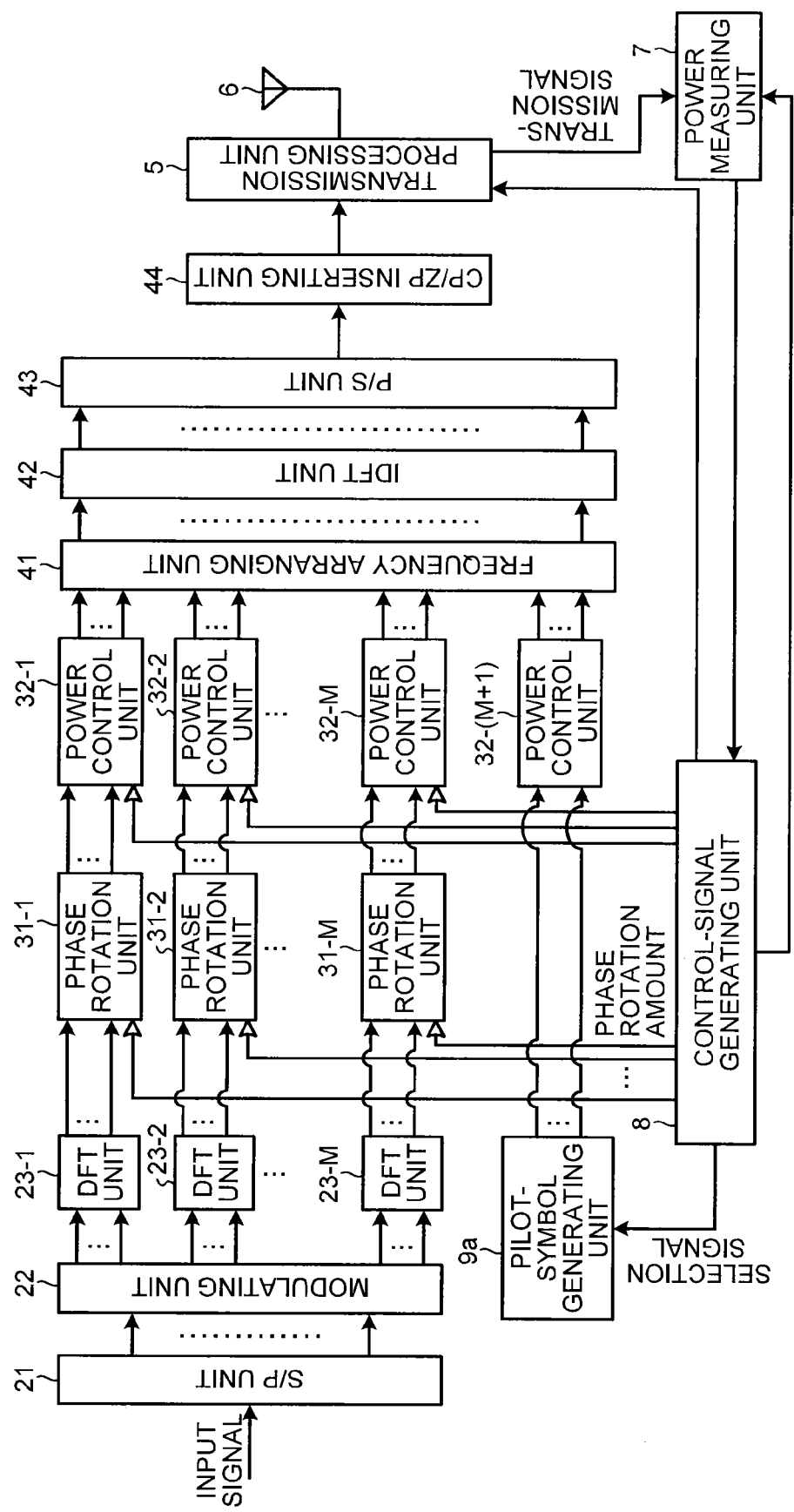
FIG. 19 is a diagram of a functional configuration example of a transmitting apparatus according to a sixth embodiment.

FIG. 19 is a diagram of a functional configuration example of the transmitting apparatus according to a sixth embodiment of the present invention. As shown in FIG. 19, the transmitting apparatus according to this embodiment is the same as the transmitting apparatus according to the fourth embodiment except that power control units 32-1 to 32-(M+1) are added to the transmitting apparatus according to the fourth embodiment. Components having functions same as the functions in the forth embodiment are denoted by reference numerals and signs same as the reference numerals and signs in the fourth embodiment. Redundant explanation of the components is omitted.

In the fourth embodiment, the example in which the phase rotation is performed as the control processing is explained. In the sixth embodiment, both of phase rotation and power control are performed. Signals subjected to the phase rotation by the phase rotation units 31-1 to 31-M and pilot symbols generated by the pilot-symbol generating unit 9a are respectively input to the power control units 32-1 to 32-(M+1).

The power-control units 32-1 to 32-(M+1) control, based on a control signal input from the control-signal generating unit 8, electric power (the magnitude of signals) to set a predetermined power distribution to a predetermine distribution ratio. For example, M is set to 2, four types of "1:1:1", "1:2:1", "2:1:2", and "1:1:2" are prepared as candidates of three distribution ratios of the power control units 32-1 to 32-3, and control signals are generated in order based on the candidates.

If both of the phase rotation and the power control are performed, when the number of candidates of phase rotation amounts is represented as C1 and the number of candidates of distribution ratios of the power control is represented as C2, C1×C2 combinations are possible. The control-signal generating unit 8 can sequentially set candidates of phase rotation amounts and acquire power information concerning all the combinations and select an optimum combination. Alternatively, the control-signal generating unit 8 can select one of the phase rotation and the power control according to an input signal and other conditions and select an optimum candidate from C1 or C2 combinations.

In this embodiment, the combinations of the two kinds of control processing, i.e., the phase rotation and the power control are explained. However, other two or more kinds of control processing such as a cyclic shift and power control can be combined or three or more kinds of control processing can be combined.

In this way, in this embodiment, both of the phase rotation and the power control are performed as the control processing. Therefore, it is possible to more effectively suppress transmission peak power compared with transmission peak suppression performed by using one control processing.

Seventh Embodiment.

Figure 20:
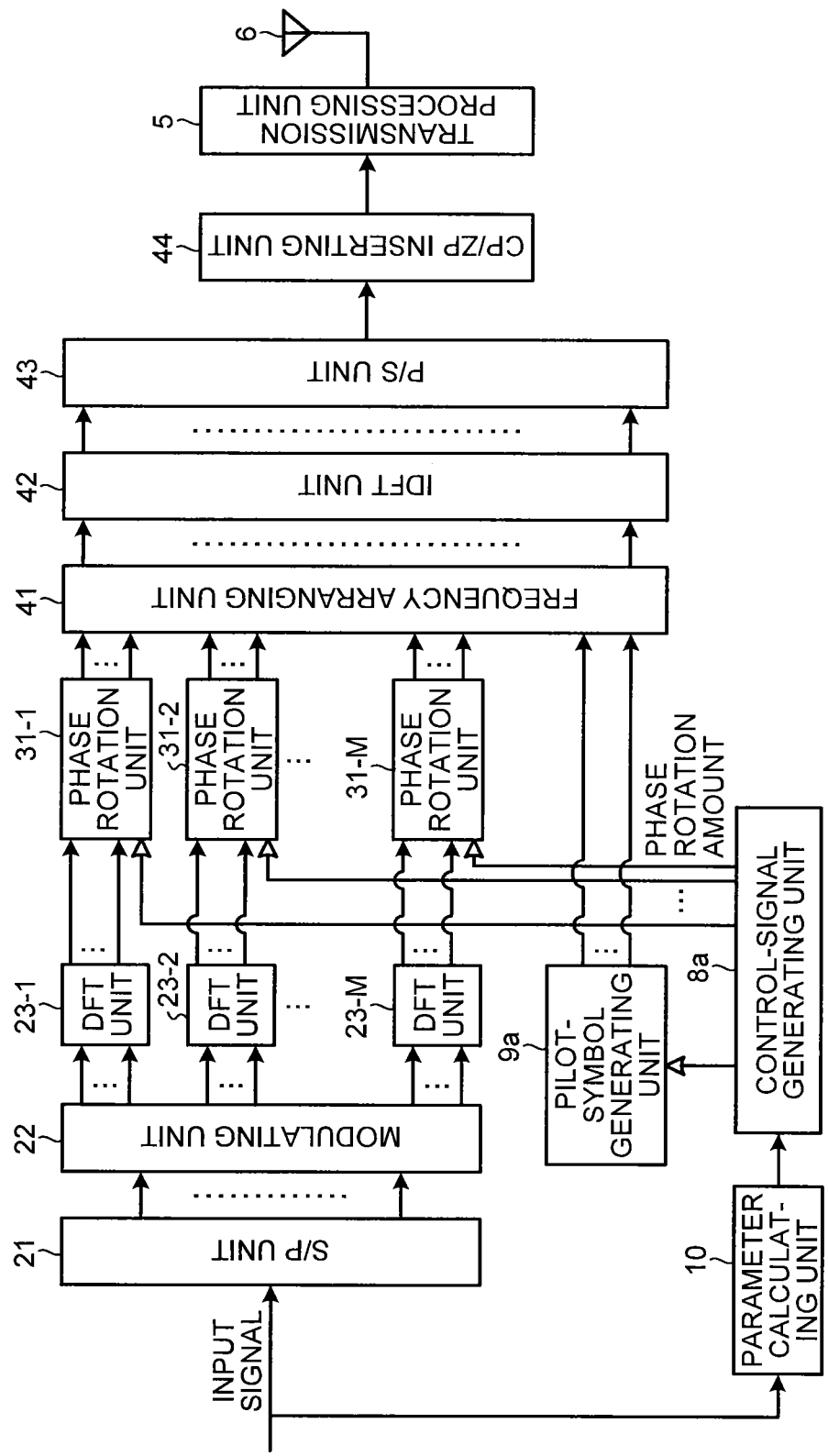
FIG. 20 is a diagram of a functional configuration example of a transmitting apparatus according to a seventh embodiment.

FIG. 20 is a diagram of a functional configuration example of the transmitting apparatus according to a seventh embodiment of the present invention. As shown in FIG. 20, the transmitting apparatus according to this embodiment is the same as the transmitting apparatus according to the fourth embodiment except that the power measuring unit 7 is removed, the parameter calculating unit 10 is added, and the control-signal generating unit 8a is provided instead of the control-signal generating unit 8. Components having functions same as the functions in the fourth embodiment are denoted by reference numerals and signs same as the reference numerals and signs in the fourth embodiment. Redundant explanation of the components is omitted.

In this embodiment, when SC transmission is performed and phase rotation is performed as control processing, an optimum candidate is selected by parameter calculation as in the third embodiment. The parameter calculating unit 10 in this embodiment is the same as the parameter calculating unit 10 explained in the third embodiment. The parameter calculating unit 10 selects, based on an input signal, an optimum candidate of control values (phase rotation amounts in this case) and inputs a selection signal to the control-signal generating unit 8a and the pilot-symbol generating unit 9a. As in the third embodiment, the control-signal generating unit 8a generates, based on the selection signal, control signals corresponding to the optimum candidate and inputs the control signals to the phase rotation units 31-1 to 31-M. Operations in this embodiment other than the operations explained above are the same as the operations in the third or fourth embodiment.

In this way, in this embodiment, when the SC transmission is performed and the phase rotation is performed as the control processing, an optimum candidate is selected by the parameter calculation as in the third embodiment. Therefore, when the SC transmission is performed and the phase rotation is performed as the control processing, it is possible to obtain a same effect as the effect in the third embodiment.

Eighth Embodiment.

Figure 21:
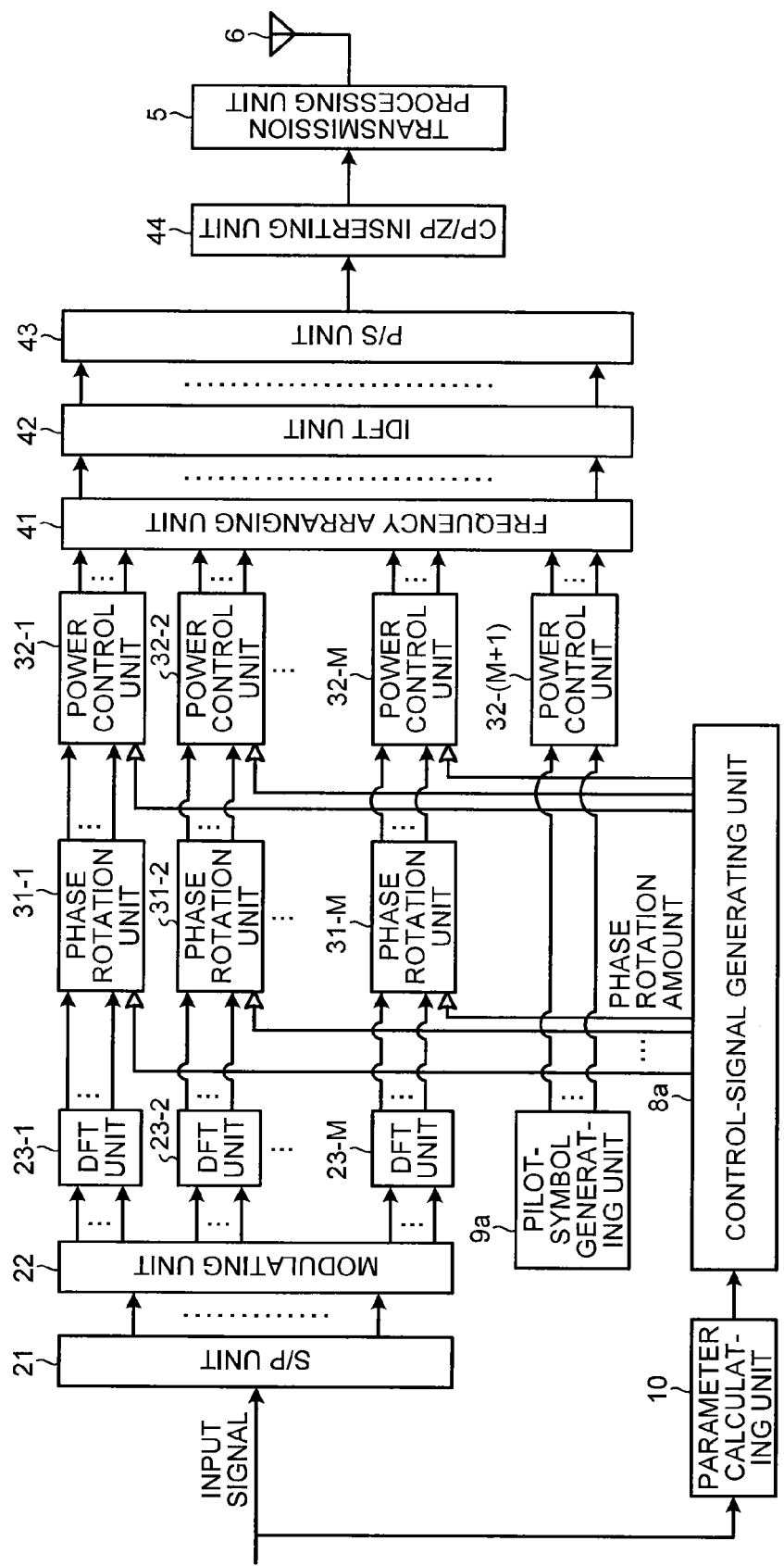
FIG. 21 is a diagram of a functional configuration example of a transmitting apparatus according to an eighth embodiment.

FIG. 21 is a diagram of a functional configuration example of the transmitting apparatus according to an eighth embodiment of the present invention. As shown in FIG. 21, the transmitting apparatus according to this embodiment is the same as the transmitting apparatus according to the sixth embodiment except that the power measuring unit 7 is removed, the parameter calculating unit 10 is added, and the control-signal generating unit 8a is provided instead of the control-signal generating unit 8. Components having functions same as the functions in the sixth embodiment are denoted by reference numerals and signs same as the reference numerals and signs in the sixth embodiment. Redundant explanation of the components is omitted.

In this embodiment, when SC transmission is performed and phase rotation and power control are performed as control processing, an optimum candidate is selected by parameter calculation as in the third embodiment. The parameter calculating unit 10 in this embodiment is the same as the parameter calculating unit 10 explained in the third embodiment. The parameter calculating unit 10 selects, based on an input signal, an optimum candidate of control values (phase rotation amounts and distribution ratios of power distribution in this case) and inputs a selection signal to the control-signal generating unit 8a and the pilot-symbol generating unit 9a. As in the third embodiment, the control-signal generating unit 8a generates, based on the selection signal, control signals corresponding to the optimum candidate and inputs the control signals to the phase rotation units 31-1 to 31-M and the power control units 32-1 to 32-(M+1). Operations in this embodiment other than the operations explained above are the same as the operations in the third or sixth embodiment.

In this way, in this embodiment, when the SC transmission is performed and the phase rotation and the power control are performed as the control processing, an optimum candidate is selected by the parameter calculation as in the third embodiment. Therefore, when the SC transmission is performed and the phase rotation and the power control are performed as the control processing, it is possible to obtain a same effect as the effect in the third embodiment.

Ninth Embodiment.

In the embodiments explained above, the method of dividing data of one block and selecting a control method to set transmission power of a symbol of one block to be equal to or smaller than a target value is explained. However, it is also possible to select a control method to associatively set transmission powers of a plurality of blocks to be equal to or smaller than the target value. In this case, when the number of target blocks is represented as NB and the number of candidates of a control method for a signal of one block is represented as C, the number of candidates of control values is represented as $C^{NB}$. For example, when power information is transmission peak power, a transmission side stores NB data blocks in a memory and selects an optimum candidate for each of the blocks out of the $C^{NB}$ candidate to minimize transmission peak power of the blocks. After generating control signals corresponding to a first block based on the selected candidate, the transmission side generates control signals corresponding to the next block. In this way, the transmission side generates control signals for each input of data of one block to generate control signals for the NB blocks. A reception side stores controlled NB reception blocks in a memory and performs release and demodulation of control processing.

Figure 22:
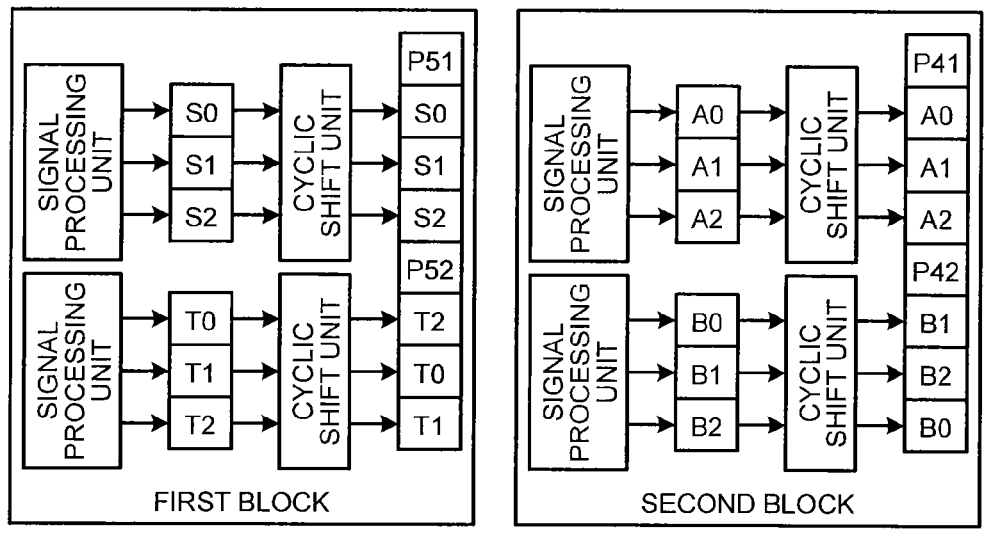
FIG. 22 is a diagram of an example of a control method according to a ninth embodiment.
Figure 22:
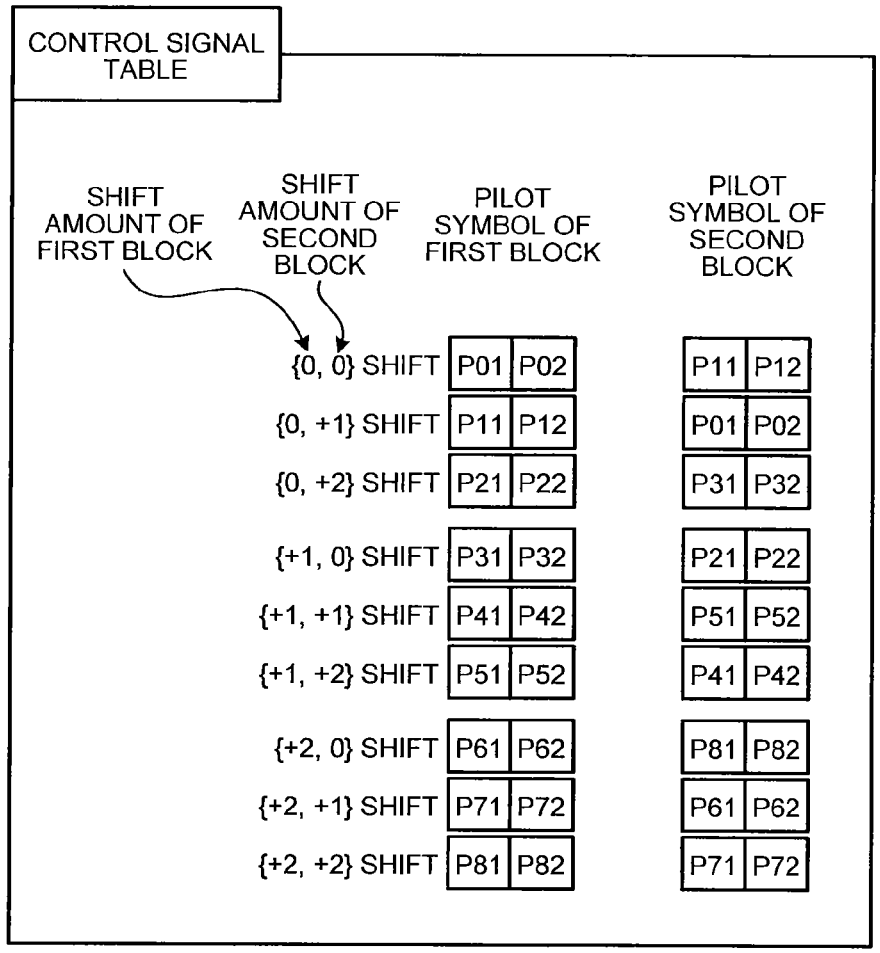

A method of transmitting a data symbol when NB is set to two blocks is explained using the specific example explained in the second embodiment. FIG. 22 is a diagram of an example of a control method in the ninth embodiment. In FIG. 22, as an example, pilot symbols are changed according to a selected candidate. In FIG. 22, a cyclic shift for a first block is represented as a (a shift amount), a cyclic shift for a second block is represented as b (a shift amount), and a shift candidate for two groups is represented as {a, b}. In the example shown in FIG. 22, shift amounts for $C^{NB}=32=9$ candidates are present. A transceiver in this embodiment prepares pilot sequences for respective shift candidates and creates a table for reference. In the example shown in FIG. 22, a shift amount for minimizing transmission peak power of the first block is a=+1 and a shift amount for minimizing transmission peak power of the second block is a=+2. Therefore, a candidate of shift amounts is {+1, +2}. From the table shown in FIG. 22, a pilot sequence of the first block for the shift amount candidate {+1, +2} is {P51, P52} and a pilot sequence of the second block is {P41, P42}. In this example, the two blocks are used and the control method is the cyclic shift. However, it is possible to use another control method such as phase rotation or apply the control method to a plurality of data blocks. A way of arranging pilot symbols in the table for reference can be set using any reference.

Tenth Embodiment.

Figure 23:
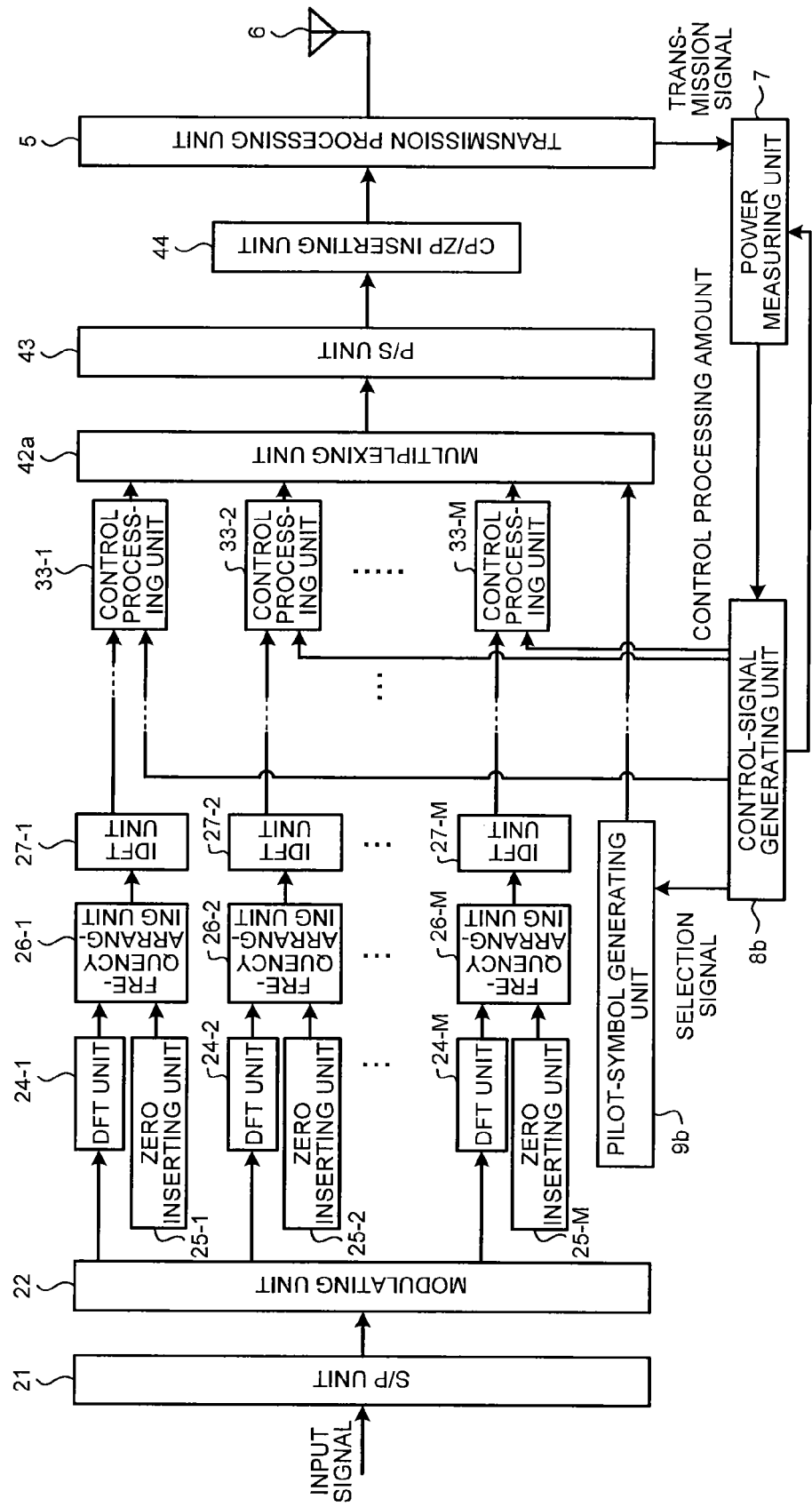
FIG. 23 is a diagram of a functional configuration example of a transmitting apparatus according to a tenth embodiment.

FIG. 23 is a diagram of a functional configuration example of the transmitting apparatus according to a tenth embodiment of the present invention. In the third embodiment, the method of performing the phase rotation to suppress peak power is explained. In this embodiment, a method of applying peak power suppression control in a time domain is explained. As a specific example, a configuration example in which a cyclic shift is applied to signals to multiplex the signals in the time domain is explained.

The transmitting apparatus according to this embodiment includes DFT units 24-1 to 24-M and zero inserting units 25-1 to 25-M. The transmitting apparatus arranges, using frequency arranging units 26-1 to 26-M, DFT outputs (outputs from the DFT units 24-1 to 24-M) and zero (zero output from the zero inserting units 25-1 to 25-M) in a frequency domain. IDFT units 27-1 to 27-M convert signals arranged in the frequency domain by the frequency arranging units 26-1 to 26-M into time domain signals and output the time domain signals to control processing units 33-1 to 33-M.

The control processing units 33-1 to 33-M apply predetermined control processing to time domain signals input based on a control processing amount instructed from a control-signal generating unit 8b. The predetermined control processing is processing for suppressing transmission power. As in the first embodiment, the predetermined control processing can be phase rotation, a timing shift, a cyclic shift, power distribution, or the like or can be a combination of the phase rotation, the timing shift, the cyclic shift, the power distribution, and the like. A multiplexing unit 42a performs multiplexing of signals subjected to the control processing by the control processing units 33-1 to 33-M and signals output from a pilot-symbol generating unit 9b. In the multiplexing unit 42a, any multiplexing method can be used. For example, there is a multiplexing system for adding signals for M channels, where M is a complex number.

Pilot symbols output from the pilot-symbol generating unit 9b are time domain signals. A signal multiplexed by the multiplexing unit 42a is transmitted from the antenna 6 through the P/S unit 43, the CP/ZP inserting unit 44, and the transmission processing unit 5. The power measuring unit 7 measures transmission peak power of the transmission signal. The control-signal generating unit 8b retains C control processing candidates. The control-signal generating unit 8b selects one of the C control processing candidates and inputs the control processing candidate as a control processing amount. The control-signal generating unit 8b sequentially inputs the control processing amounts until transmission signals corresponding to the C control processing candidates are respectively generated. Consequently, the control-signal generating unit 8b selects a control processing candidate in which minimum transmission peak power is obtained.

Figure 24:
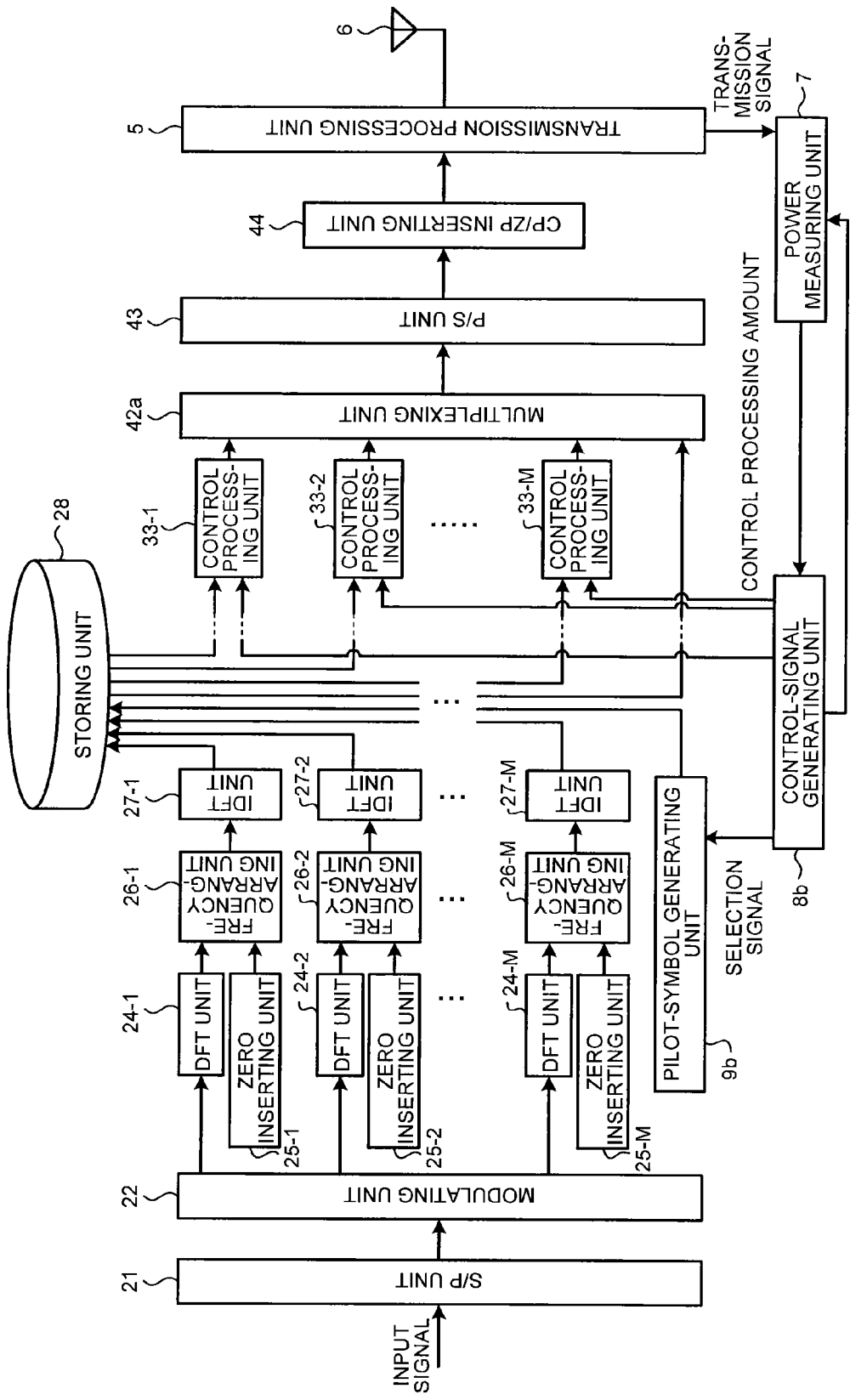
FIG. 24 is a diagram of a configuration example of a transmitting apparatus according to the tenth embodiment when storing an IDFT output signal.

If signals and pilot symbols (in the time domain) output from the IDFT units 27-1 to 27-M are stored, it is unnecessary to perform IDFT processing for each of the control processing candidates. FIG. 24 is a diagram of a configuration example of the transmitting apparatus according to this embodiment that stores signals output from the IDFT units 27-1 to 27-M. In the configuration example shown in FIG. 24, the transmitting apparatus includes a storing unit 28 configured to store signals output from the IDFT units 27-1 to 27-M. Consequently, even when the number of control processing candidates C is a large number, it is possible to attain peak power suppression with a small computational amount.

Figure 25:
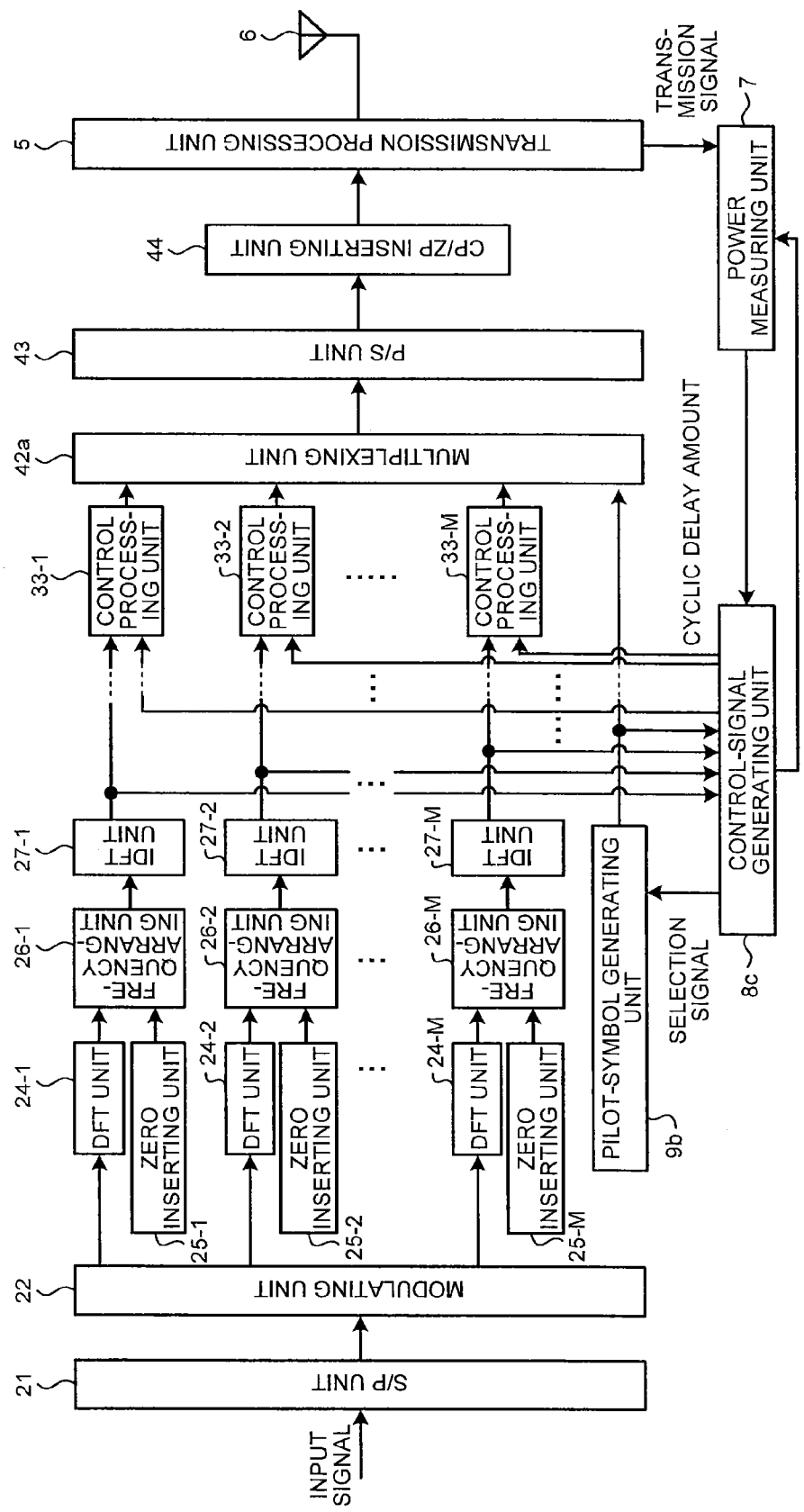
FIG. 25 is a diagram of a configuration example of the transmitting apparatus according to the tenth embodiment for reducing a computational amount.

A method of further reducing a computational amount is explained below. For simplification of explanation, it is assumed that control processing is cyclic shift processing. However, the control processing is not limited to this. FIG. 25 is a diagram of a configuration example of the transmitting apparatus according to this embodiment for reducing a computational amount. To reduce the number of cyclic shift candidates and further reduce the computational amount, as shown in FIG. 25, signals output from the IDFT units 27-1 to 27-M can be input to a control-signal generating unit 8c to select a cyclic shift with which peak power is reduced. A method of searching for a cyclic shift amount with which peak power is reduced is not limited. An example of the cyclic shift amount is explained. In FIG. 25, because the control processing units 33-1 to 33-M perform the cyclic shift processing, the control processing units 33-1 to 33-M are described as cyclic shift units 33-1 to 33-M.

Figure 26:
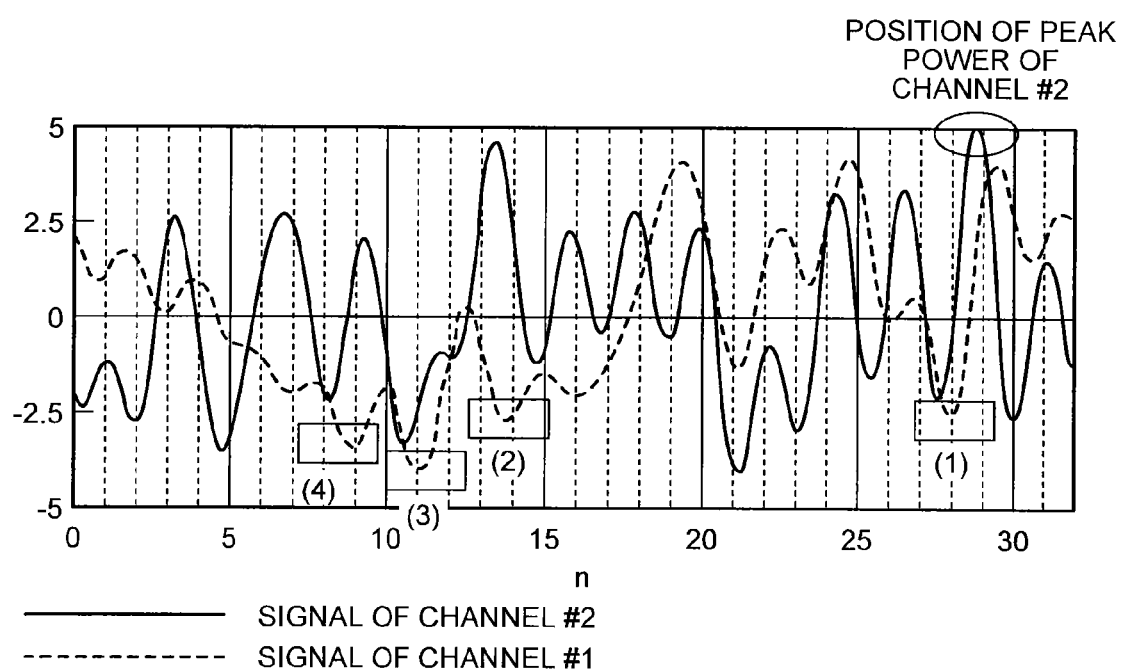
FIG. 26 is a diagram of an example of a method of searching for a cyclic shift amount.

FIG. 26 is a diagram of an example of the method of searching for a cyclic shift amount. In FIG. 26, M is set to 2, a dotted line indicates an example of a waveform of an output signal of the IDFT unit 27-1 (represented as a channel #1), and a solid line indicates an example of a waveform of an output signal of the IDFT unit 27-2 (represented as a channel #2). For simplification of explanation, it is assumed that the output signals of the channel #1 and the channel #2 are real numbers. However, this method can be used for complex number signals as well. In this example, a cyclic shift is applied to the signal of the solid line to suppress peak power of a multiplexed signal.

As shown in FIG. 26, it is seen that a peak of the waveform of the channel #2 is present near n=29. The multiplexing in the time domain is an addition of IDFT unit outputs. Therefore, in the waveform of the channel #1, the cyclic shift only has to be applied to the signal of the channel #2 output up to positions where a phase is opposite to the phase of the peak. For example, in the waveform of the channel #1, the positions where a phase is opposite to the phase of the peak are n=28 ((1) in FIG. 26), n=14 ((2) in FIG. 26), n=11 ((3) in FIGS. 26), and n=9 ((4) in FIG. 26). Therefore, shifts of +1, +15, +18, and +20 in the left direction are likely candidates of the cyclic shift.

To reduce a computational amount necessary for the search, it is sufficient to search for only likely candidates without searching for peak power of all cyclic shift candidates. In this example, the number of searched candidates of the cyclic shift are C-(0, +1, +15, +18, +20) including a case in which the cyclic shift is not applied. Such a search is performed by the control-signal generating unit 8c.

Figure 27:
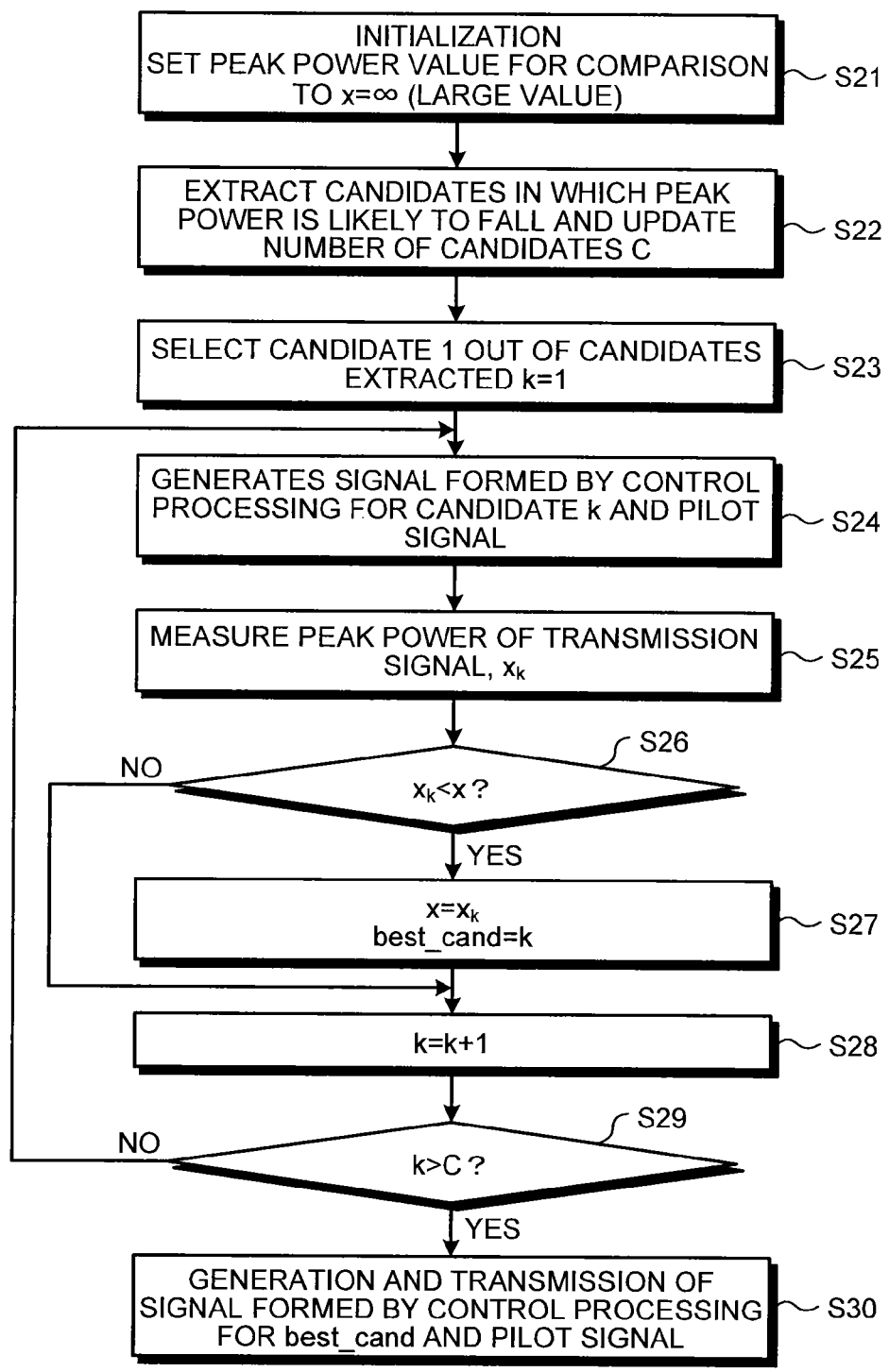
FIG. 27 is a diagram of an example of a procedure for searching for a cyclic shift amount in a control-signal generating unit.

FIG. 27 is a diagram of an example of a search procedure for a cyclic shift amount in the control-signal generating unit 8c. First, as initialization, the control-signal generating unit 8c sets the peak power value for comparison x to the finite (a large value) (step S21). The control-signal generating unit 8c extracts, based on output signals from the IDFT units 27-1 and 27-2, candidates in which peak power is likely to fall among all cyclic shift candidates and updates the number of candidates C (step S22). The control-signal generating unit 8c selects one candidate out of the candidates extracted at step S22 and sets k indicating a candidate number to k=1 (step S23).

The control-signal generating unit 8c inputs control processing signals corresponding to the candidate k to the control processing units 33-1 to 33-M and generates a transmission signal formed by a result of control processing corresponding to the candidate k and a pilot signal (step S24). The control-signal generating unit 8c acquires a measured value $x_k$ of peak power by the power measuring unit 7 (step S25) and determines whether $x_k$ is smaller than x (step S26). When $x_k$ is smaller than x (Yes at step S26), the control-signal generating unit 8c sets x to be equal to $x_k$ and set best_cand (a number of an optimum candidate) to be equal to k (step S27). The control-signal generating unit 8c sets k to be equal to k+1 (step S28) and determines whether k is larger than C (step S29). When k is larger than C (Yes at step S29), the control-signal generating unit 8c inputs control processing signals corresponding to best_cand to the control processing units 33-1 to 33-M and generates a transmission signal formed by a result of control processing corresponding to best_cand and a pilot signal (step S30).

On the other hand, when $x_k$ is equal to or larger than x at step S26 (No at step S26), the control-signal generating unit 8c proceeds to step S28. When k is equal to or smaller than C at step S29 (No at step S29), the control-signal generating unit 8c returns to step S24. According to the procedure explained above, it is possible to perform peak power suppression with a small number of candidates. The example in which the pilot symbols are transmitted is explained above. However, when the pilot signals are not transmitted, processing concerning the pilot symbols only has to be omitted.

Figure 28:
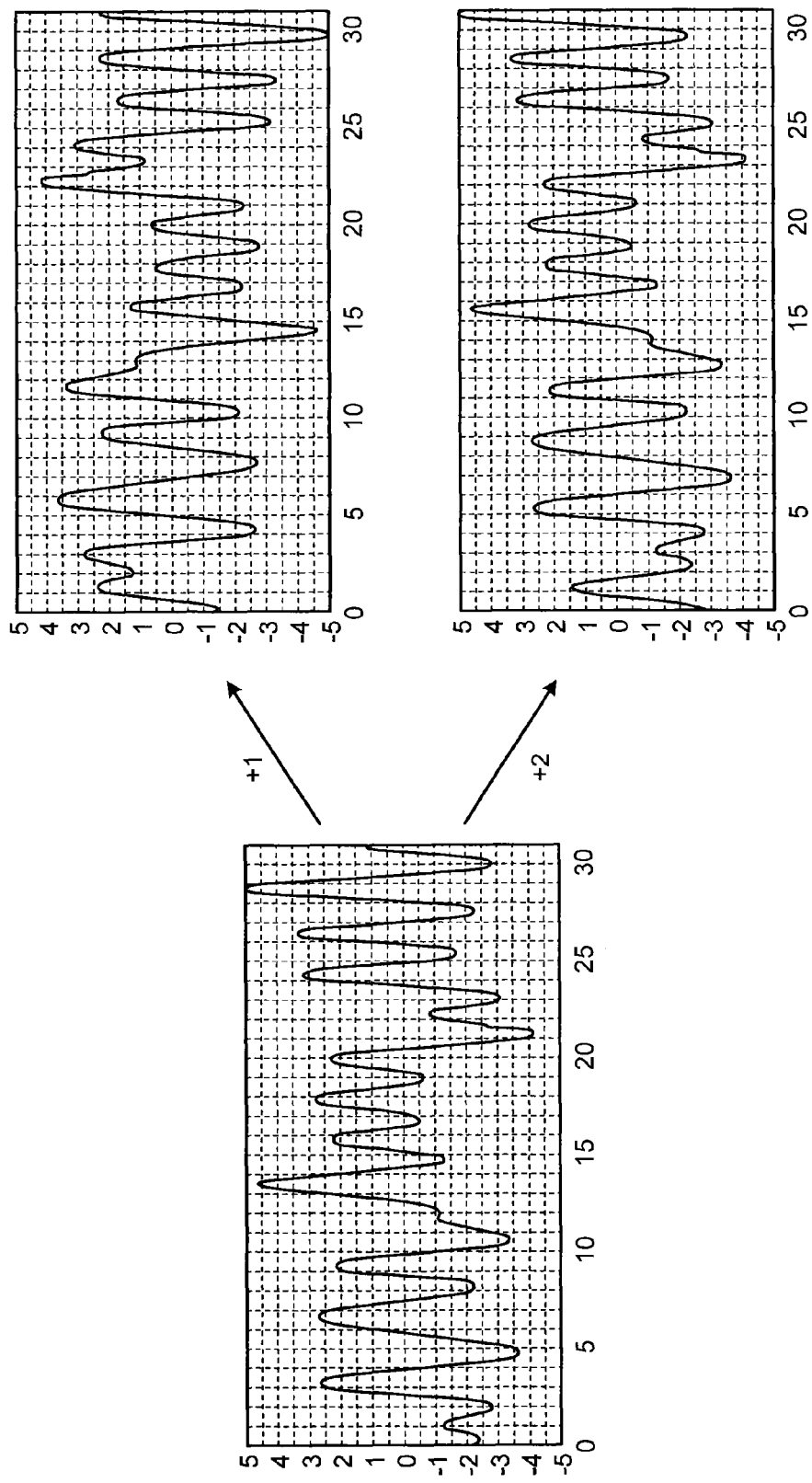
FIG. 28 is a diagram of an example of a cyclic shift.

There is no limitation on a way of applying the cyclic shift. For example, as shown in FIG. 28, processing for inverting an entire signal every time the cyclic shift is shifted in a one symbol unit in a time domain can be performed. In FIG. 28, an example in which the cyclic shift is shifted to the right in a one symbol unit and an example in which the cyclic shift is shifted in a two symbol unit are shown. The way of applying the cyclic shift is not limited to the cyclic shift at symbol interval. It is also possible to use a method of applying the cyclic shift in a fraction unit (at a 0.5, 0.3, or 2.7 symbol interval, etc.) using an intersymbol interpolation such as a polyphase interpolation filter used in general.

In the embodiments explained above, the example in which the SC transmission is performed is explained. However, the present invention is not limited to this example and can be applied to transmitting apparatuses and receiving apparatuses of various systems including a wired system. As the content of the control processing, the phase rotation, the power control, and the cyclic shift are explained. However, the present invention is not limited to these kinds of control processing. Other methods can be used. A plurality of methods can be combined. The configurations of the transmitting apparatus and the receiving apparatus are not limited to the apparatus configurations explained in the embodiments. The frequency arranging unit explained in the embodiments can perform signal arrangement on a frequency in any way.

INDUSTRIAL APPLICABILITY

1 Group processing unit
2-1 to 2-M Signal processing units
3-1 to 3-(M+1) Control processing units
4 Combination processing unit
5 Transmission processing unit
6 Transmission antenna
7, 7-1, 7-2 Power measuring units
8, 8a Control-signal generating units
9, 9a Pilot-symbol generating units
21, 21-1, 21-2 S/P units
22, 22-1, 22-2 Modulating units
23-1 to 23-2M DFT units
31-1 to 31-2M Phase rotation units
32-1 to 32-M Power control units
41, 41-1, 41-2 Frequency arranging units
42, 42-1, 42-2 IDFT units
43 P/S unit
44 CP/ZP inserting unit
100 Transmission-signal selecting unit

The invention claimed is:

1. A transmitting apparatus comprising:
circuitry including:
a data dividing circuitry portion configured to divide data of one block into M divided data, M being equal to or larger than 2;
M Fourier transform circuitry portions configured to perform Fourier transform processing for each of the M divided data and generate M data subjected to Fourier transform;
M control processing circuitry portions configured to apply predetermined control processing to each of the M data subjected to the Fourier transform and generate M data subjected to the control processing;
a combination processing circuitry portion configured to apply inverse Fourier transform processing to the M data subjected to the control processing and combine the M data subjected to the control processing into one signal;
a transmission processing circuitry portion configured to apply predetermined transmission processing to the combined signal to convert the signal into a transmission signal;
a candidate selecting circuitry portion configured to retain a predetermined number of control value candidates, one set of which includes M control values used in the control processing carried out by the M control processing circuitry portions, and select, as a selected candidate, one of the control value candidates based on power information of the transmission signal; and
a control-signal generating circuitry portion configured to generate M control signals for setting the M control values included in the selected candidate respectively in the control processing circuitry portions corresponding thereto and input the control signals respectively to the control processing circuitry portions corresponding thereto.

2. The transmitting apparatus according to claim 1,
wherein the circuitry further includes a power measuring circuitry portion configured to measure electric power of the transmission signal and acquire the power information based on a measurement result, and
wherein the candidate selecting circuitry portion generates, concerning all the retained control value candidates, control signals corresponding to the control value candidates, inputs the control signals to the control processing circuitry portions, acquires the power information corresponding to the control value candidates, and selects the selected candidate based on the power information for each of the control value candidates.

3. The transmitting apparatus according to claim 1, wherein the candidate selecting circuitry portion calculates, based on the data input to the data dividing circuitry portion, the power information corresponding to the control value candidates and selects the selected candidate based on the power information for each of the control value candidates.

4. The transmitting apparatus according to claim 1,
wherein the circuitry further includes a pilot-symbol generating circuitry portion configured to retain a predetermined number of pilot sequences, select one of the retained pilot sequences, and output the pilot sequence as pilot symbols,
wherein the candidate selecting circuitry portion associates the control value candidates and the pilot sequences in a one-to-one relation and inputs, to the pilot-symbol generating circuitry portion, a selection signal for instructing the pilot-symbol generating circuitry portion to select pilot sequences corresponding to the control value candidates, and
wherein the combination processing circuitry portion further combines the pilot symbols to generate the one signal.

5. The transmitting apparatus according to claim 1, wherein the circuitry further includes:
M signal arranging circuitry portions configured to apply the Fourier transform processing and zero insertion to the M divided data for each of the M divided data and subject the data, which are subjected to the Fourier transform and zero insertion processing, to signal arrangement in a frequency domain; and
M inverse Fourier transform circuitry portions configured to convert signals subjected to the signal arrangement into signals in a time domain through inverse Fourier transform processing and input the converted signals respectively to the control processing circuitry portions,
wherein the control processing circuitry portions set data subjected to the inverse Fourier transform processing as targets of the control processing, and
wherein the combination processing circuitry portion performs combination into the one signal through multiplexing processing.

6. The transmitting apparatus according to claim 5,
wherein the circuitry further includes a storage circuitry portion configured to store the M data subjected to the inverse Fourier transform processing output from the M inverse Fourier transform circuitry portions,
wherein the M data subjected to the inverse Fourier transform processing output from the M inverse Fourier transform circuitry portions is stored in the storing circuitry portion, and
wherein in the control processing in second and subsequent times for same data, the control processing circuitry portions set time domain signals read out from the storing circuitry portion as targets of the control processing.

7. The transmitting apparatus according to claim 5, wherein the control-signal generating circuitry portion selects, based on the M data subjected to the inverse Fourier transform processing, the control value candidates in a number smaller than the predetermined number out of the predetermined number of the control value candidates, and selects the selected candidate based on the power information of the transmission signal obtained by carrying out the control processing corresponding to the selected control value candidates smaller in the number than the predetermined number.

8. The transmitting apparatus according to claim 1, wherein the power information is transmission peak power.

9. The transmitting apparatus according to claim 1, wherein a cyclic shift processing is included as the control processing.

10. The transmitting apparatus according to claim 1, wherein phase rotation processing is included as the control processing.

11. The transmitting apparatus according to claim 1, wherein processing to control a distribution ratio of electric power to the M divided data is included as the control processing.

12. The transmitting apparatus according to claim 1, wherein the control value candidates include control values corresponding to a plurality of blocks, and the candidate selecting circuitry portion selects the control value candidates based on power information of transmission signals of the blocks.

13. A receiving apparatus that receives a transmission signal transmitted by a transmitting apparatus comprised of first circuitry including: a data dividing circuitry portion configured to divide data of one block into M divided data, M being equal to or larger than 2; M Fourier transform circuitry portions configured to perform Fourier transform processing for each of the M divided data and generate M data subjected to Fourier transform; M control processing circuitry portions configured to apply predetermined control processing to each of the M data subjected to the Fourier transform and generate the M data subjected to control processing; a combination processing circuitry portion configured to apply inverse Fourier transform processing to the M data subjected to the control processing and combine the M data subjected to the control processing into one signal; a transmission processing circuitry portion configured to apply predetermined transmission processing to the combined signal to convert the signal into the transmission signal; a candidate selecting circuitry portion configured to retain a predetermined number of control value candidates, one set of which includes M control values used in the control processing carried out by the M control processing circuitry portions, and select, as a selected candidate, one of the control value candidates based on power information of the transmission signal; and a control-signal generating circuitry portion configured to generate M control signals for setting the M control values included in the selected candidate respectively in the control processing circuitry portions corresponding thereto and input the control signals respectively to the control processing circuitry portions corresponding thereto, the receiving apparatus comprising:
second circuitry including:
a dividing circuitry portion configured to divide the transmission signal into the divided data;
a control-processing removing circuitry portion configured to carry out release processing, which is processing in an inverse manner compared to processing performed by the transmitting apparatus, for each of the divided data;
a demodulation processing circuitry portion configured to perform demodulation processing based on the data subjected to the release processing to generate demodulated signals and calculate demodulation errors of the demodulated signals; and
a control-signal generating circuitry portion configured to retain removal control value candidates, which are control values used for the release processing, corresponding to the respective predetermined number of the control value candidates, generate, concerning all the retained removal control value candidates, control signals corresponding to the removal control value candidates, input the control signals to the control-processing removing circuitry portion, and acquire the demodulation errors corresponding to the removal control value candidates, select one removal control value candidate based on the demodulation error for each of the removal control value candidates, and instruct the demodulation processing circuitry portion to select the demodulated signal corresponding to the selected removal control value candidate and output the demodulated signal as a demodulation result.

14. The receiving apparatus according to claim 13,
wherein the transmission signal includes the M divided data combined with pilot sequences corresponding to the control value candidates in a one-to-one relation,
wherein the second circuitry further includes a pilot processing circuitry portion configured to select, based on the pilot sequences included in the transmission signal, the control value candidate used in the predetermined control processing subjected to the transmission signal,
wherein the dividing circuitry portion divides the transmission signal into the divided data and the pilot sequences and input the pilot sequences to the pilot processing circuitry portion, and
wherein the control-signal generating circuitry portion generates control signals based on the removal control value candidate corresponding to the control value candidate selected by the pilot processing circuitry portion among the retained removal control value candidates, and inputs the control signals to the control-processing removing circuitry portion.

15. The receiving apparatus according to claim 13,
wherein the second circuitry further includes memory configured to retain the transmission signals equivalent to a plurality of blocks, and
wherein the removal control value candidates include control values corresponding to the blocks, and the control-signal generating circuitry portion generates the control signals equivalent to the blocks.

16. A communication method comprising:
dividing data of one block into M divided data, M being equal to or larger than 2;
performing Fourier transform processing for each of the M divided data and generate M data subjected to Fourier transform;
carrying out predetermined control processing for each of the M data subjected to Fourier transform;
applying inverse Fourier transform processing to the M data subjected to the control processing and combining the M data subjected to the control processing into one signal;
applying predetermined transmission processing to the combined signal to convert the signal into a transmission signal;
retaining a predetermined number of control value candidates, one set of which includes M control values used in the control processing and selecting, as a selected candidate, one of the control value candidates based on power information of the transmission signal; and
generating M control signals to set the M control values included in the selected candidate respectively corresponding thereto and outputting the generated M control signals respectively for said carrying out predetermined control processing for each of the divided data subjected to Fourier transform.

* * * * *